United States Patent
Kato et al.

(10) Patent No.: US 6,215,781 B1
(45) Date of Patent: Apr. 10, 2001

(54) VIDEO TRANSMITTING APPARATUS

(75) Inventors: Hitoshi Kato; Akino Inoue; Shinji Nojima; Shugo Horikami, all of Tokyo; Satoshi Kageyu, Fujisawa, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/007,171

(22) Filed: Jan. 14, 1998

(30) Foreign Application Priority Data

Feb. 6, 1997 (JP) .................................................. 9-023531

(51) Int. Cl.[7] .................................................. H04J 3/00
(52) U.S. Cl. ........................... 370/345; 370/442; 370/487; 370/498; 348/705; 348/720
(58) Field of Search ..................................... 370/335, 342, 370/343, 345, 350, 441, 442, 479, 480, 487, 498; 340/825.49, 825.79, 825.83; 348/705, 706, 720; 364/918; 380/5

(56) References Cited

U.S. PATENT DOCUMENTS

| | | | |
|---|---|---|---|
| 4,139,901 | * 2/1979 | Granske et al. | ...................... 364/918 |
| 5,051,741 | * 9/1991 | Wesby | .............................. 340/825.49 |
| 5,291,554 | * 3/1994 | Morales | ..................................... 380/5 |
| 5,355,162 | 10/1994 | Yazolino et al. | ..................... 348/555 |
| 5,579,060 | * 11/1996 | Elberbaum | ............................ 348/705 |

FOREIGN PATENT DOCUMENTS

| | | | |
|---|---|---|---|
| 0 749 243 A1 | 12/1996 | (EP) | ................................ H04N/7/18 |
| 5-7330 | 1/1993 | (JP) | ................................ H04N/5/232 |

* cited by examiner

*Primary Examiner*—Douglas W. Olms
*Assistant Examiner*—Shick Hom
(74) *Attorney, Agent, or Firm*—Parkhurst & Wendel, LLP

(57) ABSTRACT

A video transmitting apparatus having a plurality of transmission medium for transmitting multiplexed video information, a plurality of video information receiving units each connected to a corresponding transmission medium to receive specific video information on the corresponding transmission medium, a video displaying unit for displaying video information, a switcher for connecting the video displaying unit to any one of the video information receiving units to supply video information to the video displaying unit, and a video display requesting unit for communicating with each of the video information receiving units and the switcher to request to display specific video information on the video displaying unit by giving instructions to a relevant video information receiving unit which can receive the specific video information and the switcher.

14 Claims, 14 Drawing Sheets

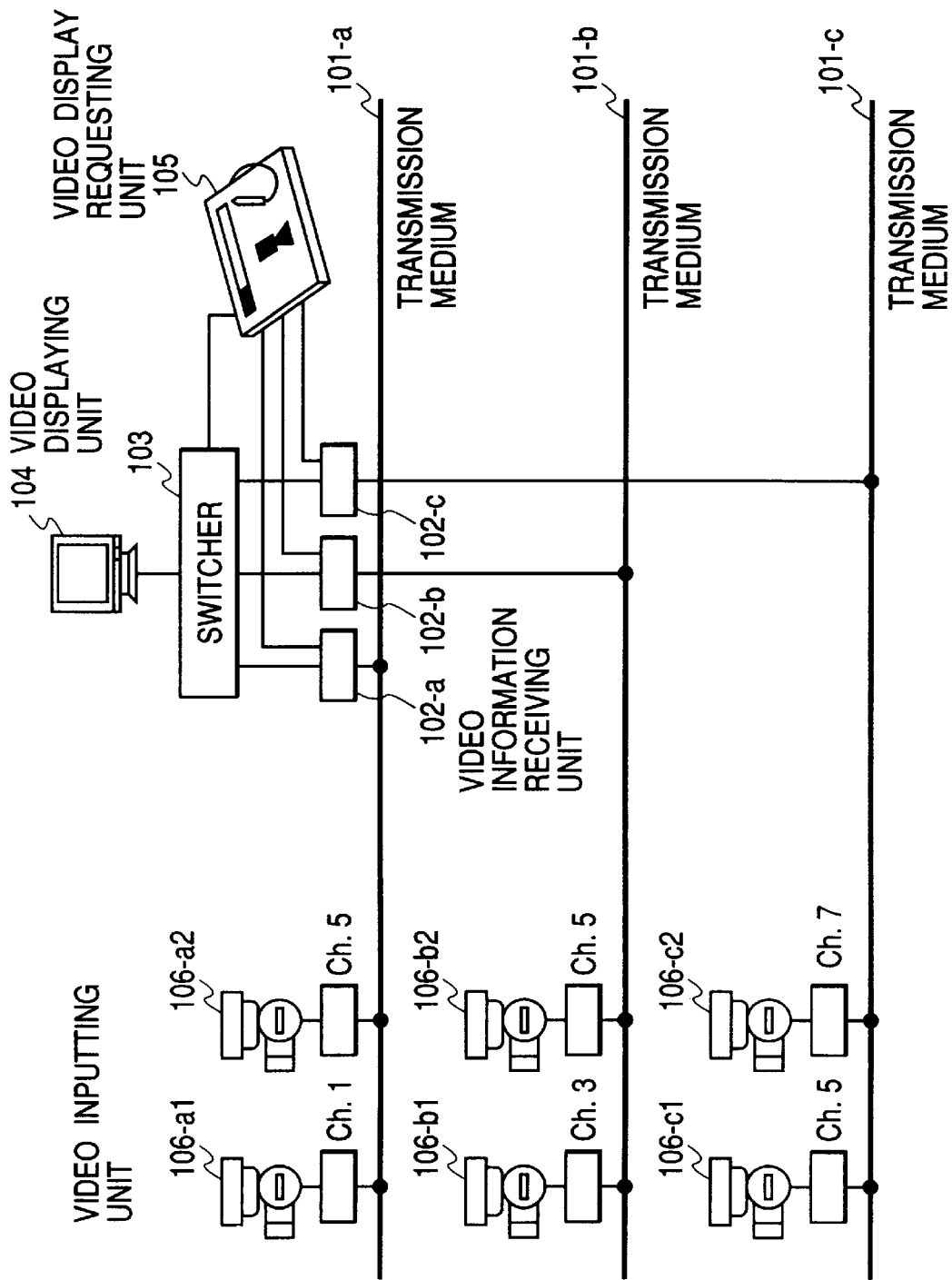

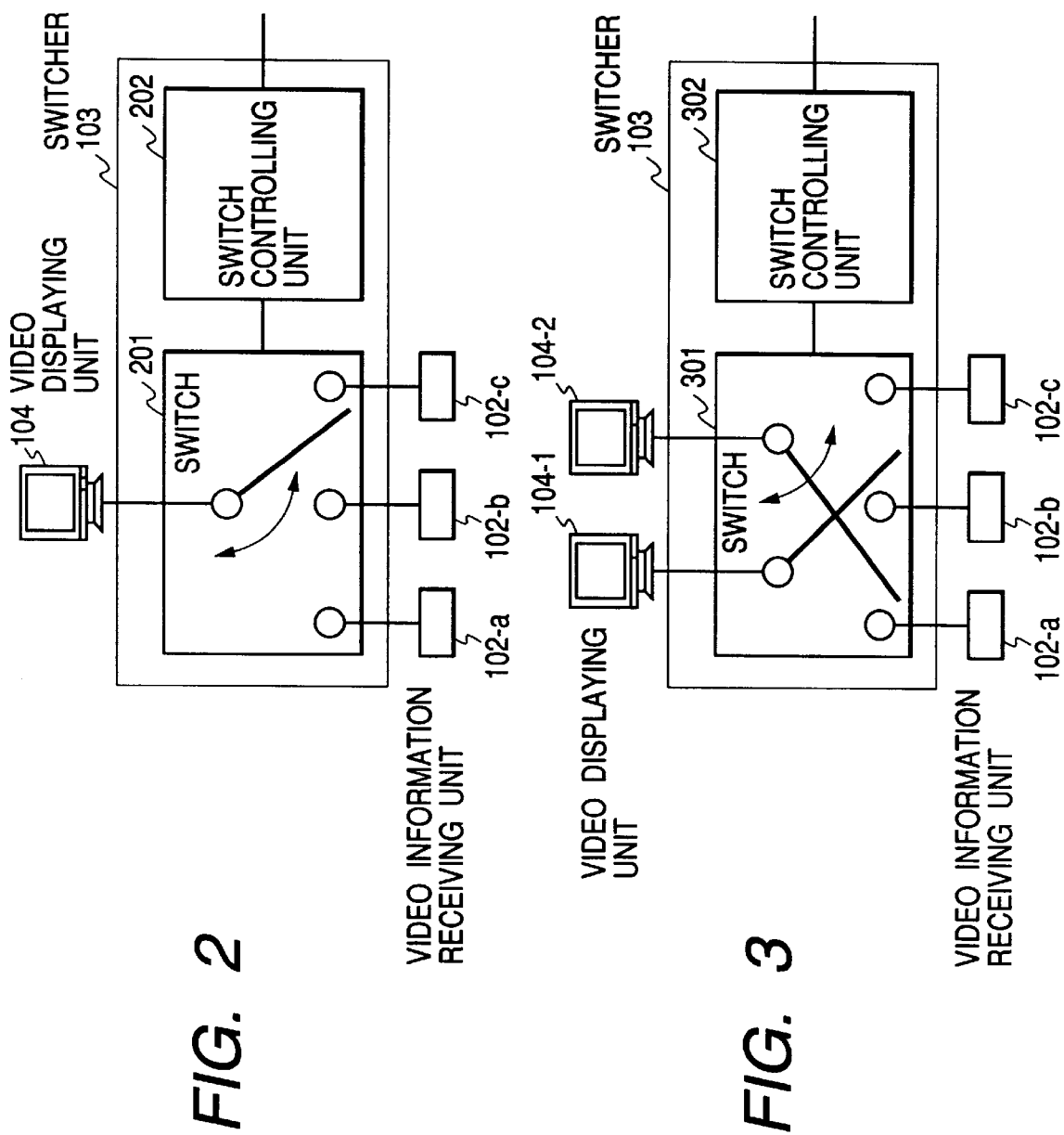

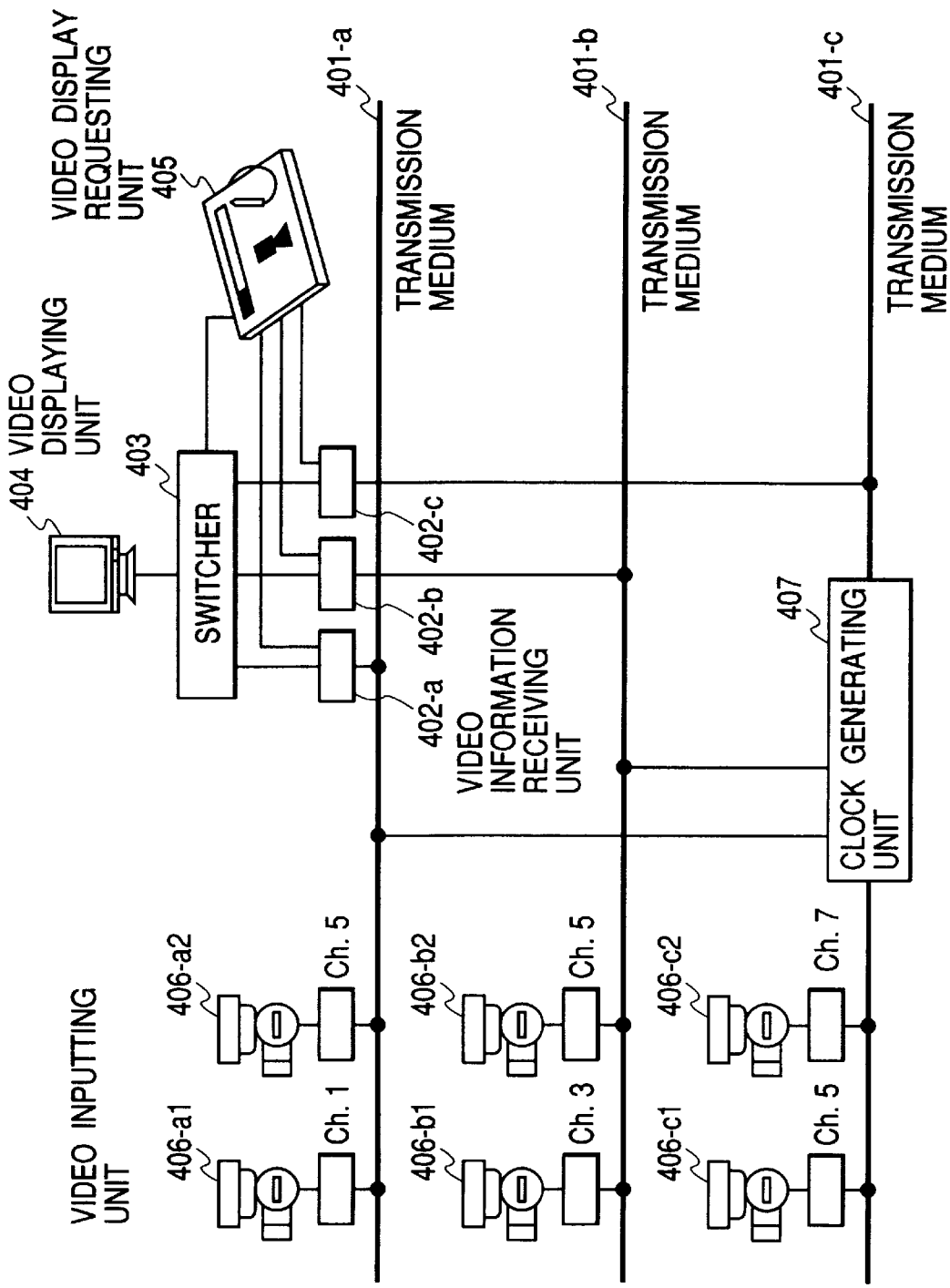

VIDEO TRANSMITTING APPARATUS

BACKGROUND OF THE INVENTION

(1) Field of the Invention

The present invention relates to a video transmitting apparatus utilizing a frequency division multiplexing technique and a time division multiplexing technique, used in a on-demand video system, a surveillance camera system, or the like, which can transmit a plural sorts of video which cannot be transmitted by one transmission medium by using a plurality of transmission media, and can switch video over a plurality of transmission media with less distortion of the video.

(2) Related Art

In a field of cable television system, surveillance camera system or the like, which needs to transmit a plural pieces of video information, there is employed a video transmitting apparatus which multiplexes video information on a transmission medium, in these years.

Hereinafter, a known video transmitting apparatus will be described. Japanese Patent Application Laid-Open Publication No. 5-7330 discloses a transmitting apparatus using a transmission medium on which a plural pieces of video information can be multiplexed. The video transmitting apparatus disclosed in Japanese Patent Application Laid-Open Publication No. 5-7330 is configured as a monitor camera system. However, it is possible to modify such the monitor camera system into a video transmitting apparatus in a cable television system, by assuming that video inputting units (cameras) are not dispersed but concentrated in a head-end portion and by employing video players as the video inputting units instead of TV cameras.

FIG. 16 shows a structure of the known transmitting apparatus. In FIG. 16, reference numerals 1601-1 through 1601-n denote video inputting units (cameras), 1602 a transmission medium on which video information inputting from the video inputting units is multiplexed and transmitted, 1603 a video outputting unit (a monitor) for displaying the transmitted video information, 1604-1 through 1604-n video information fixedly transmitting apparatus each for fixedly outputting the video information obtained by the corresponding video inputting unit 1601-1, 1601-2, . . . or 1601-n on a specific channel to the transmission medium 1602, and 1605 a video information receiving unit for selecting video information on a specific channel among a plurality of channels multiplexed on the transmission medium 1602 and outputting the same to the video displaying unit 1603.

Next, description will be made of an operation of the video transmitting apparatus with the above structure. The video information fixedly transmitting apparatus 1604-1 through 1604-n modulate video information obtained by the video inputting units (cameras) on different fixed channel resources, and multiplex the modulated video information on the transmission medium 1602. On the other hand, the video receiving apparatus on the receiving side demodulates video information signals among the multiplexed video information using a designated channel resource, and the video outputting unit (a monitor) 1603 displays the demodulated video information.

The operator can display video obtained by an arbitrary video inputting unit (camera) by changing a demodulation channel of a video information receiving unit.

However, the above video transmitting apparatus has the following disadvantages.

Since channel resources on the transmission medium are limited, the number of sorts of video that is required on the video display's side (monitor's side) at the same time can not be larger than the number of channel resources.

If two or more systems of the transmission medium are provided, it is impossible to display video obtained by a video inputting unit (camera) connected to a certain system on the video outputting unit (monitor) connected to another system.

In the case where the video (camera) is switched by changing the demodulation channel on the video display's side, a screen is distorted when the channel is switched in the middle of a video frame. This phenomenon is generated not only in a switching video connected to the same transmission medium, but also in a switching video over a plurality of transmission media.

Further, an apparatus (a video display requesting unit 1606) used to request a video display by the operator is required to be placed close to the video outputting unit (monitor).

In the light of the above disadvantages, an object of the present invention is to simultaneously supply plural sorts of video larger in number than channel resources possessed by one transmission medium by using a plurality of transmission media, enable switching of video over a plurality of transmission media, enable video transmission without distortion of video at the time of a switching of the video by synchronizing vertical synchronization signals in the transmission media, and enable video switch request from a place away from a monitor.

SUMMARY OF THE INVENTION

The present invention therefore provides a video transmitting apparatus comprising a plurality of transmission media over which multiplexed video information is transmitted, a plurality of video information receiving units, one or more of which is connected to each of the transmission media to receive specific video information among the multiplexed video information transmitted on a corresponding transmission medium, a switcher connected to the plural video information receiving units to select one or more pieces of video information among plural pieces of video information outputted from the video information receiving units, a video displaying unit connected to the switcher to display the video information selected by the switcher, and a video display requesting unit connected to the switcher and each of the plural video information receiving units to request to display specific video information on the video displaying unit.

The present invention also provides a video transmitting apparatus comprising a plurality of transmission media over which multiplexed video information is transmitted, a plurality of video information receiving units, one or more of which is connected to each of the transmission media to receive specific video information among the multiplexed video information transmitted on a corresponding transmission medium, a switcher connected to the plural video information receiving units to select one or more pieces of video information among plural pieces of video information outputted from the video information receiving units, a video displaying unit connected to the switcher to display the video information selected by the switcher, a plurality of control information transmitting-receiving units, one or more of which is connected to each of the transmission media to transmit and receive control information enabling a control through the corresponding transmission medium, and a video display requesting unit connected to the switcher and each of the plural control information transmitting-receiving units to request to display specific video information on the video displaying unit, wherein when a user of the video transmitting apparatus request to display specific video information on the video displaying unit through the video display requesting unit, the video display requesting unit requests a relevant video information receiving unit which can receive the specific video information through a corresponding control information transmitting-receiving unit and a corresponding transmission medium connected to the corresponding control information transmitting-receiving unit and the relevant video information receiving unit to receive the specific video information, and the video display requesting unit also requests the switcher to select the specific video information.

The present invention also provides a video transmitting apparatus comprising a plurality of transmission media over which multiplexed video information is transmitted, a plurality of video information receiving units, one or more of which is connected to each of the transmission media to receive specific video information among the multiplexed video information transmitted on a corresponding transmission medium, a switcher connected to the plural video information receiving units to select one or more pieces of video information among plural pieces of the video information outputted from the video information receiving units, which being connected to each of the video information receiving units through control information outputting lines to receive control information, a video displaying unit connected to the switcher to display the video information selected by the switcher, a plurality of control information transmitting-receiving units, one or more of which is connected to each of the transmission media to transmit and receive control information enabling a control through a corresponding transmission medium, and a video display requesting unit connected to each of and the plural control information transmitting-receiving units to request to display specific video information on the video displaying unit, wherein when a user of the video transmitting apparatus requests to display specific video information on the video displaying unit through the video display requesting unit, the video display requesting unit requests a relevant video information receiving unit which can receive the specific video information through a corresponding control information transmitting-receiving unit and a corresponding transmission medium connected to the corresponding control information transmitting-receiving unit and the relevant video information receiving unit to receive the specific video information, and the video display requesting unit also requests the switcher through the corresponding control information transmitting-receiving unit, the corresponding transmission medium, the relevant video information receiving unit and at least one control information outputting line connecting the relevant video information receiving unit to the switcher to select the specific video information.

The present invention also provides a video transmitting apparatus comprising a plurality of transmission media over which multiplexed video information is transmitted, a plurality of video information receiving units, one or more of which is connected to each of the transmission media to receive specific video information among the multiplexed video information transmitted on a corresponding transmission medium, the plural video information receiving units being connected by through lines to one another to transmit video information from one to another, a video displaying unit connected to any one of the plural video information receiving units to display video information outputted from the connected video information receiving unit, and a video display requesting unit connected to each of the plural video information receiving units to request to display specific video information on the video displaying unit, wherein when any one of the video information receiving units other than the video information receiving unit connected to the video displaying unit receives video information through a corresponding transmission medium, the video information receiving unit supplies the received video information to the video displaying unit through the through line(s) and other video information receiving unit(s), and the video display requesting unit instructs each of the video information receiving units to select whether the video information is received through the corresponding transmission medium or through the through line.

The present invention also provides a video transmitting apparatus comprising a plurality of transmission medium over which multiplexed video information is transmitted, a plurality of video information receiving units, one or more of which is connected to each of the transmission medium to receive specific video information among the multiplexed video information on a corresponding transmission medium, the video information receiving units being connected by through lines to one another so as to transmit video information from one to another, a video displaying unit connected to any one of the video information receiving units to display video information outputted from the connected video information receiving unit, and a plurality of control information transmitting-receiving units, one or more of which is connected to each of the transmission media to transmit and receive control information enabling a control through a corresponding transmission medium, and a video display requesting unit connected to each of the plural control information transmitting-receiving units to request to display specific video information on the video displaying unit, wherein when a user of the video transmitting apparatus requests to display specific video information on the video displaying unit through the video display requesting unit, the video display requesting unit requests a relevant video information receiving unit which can receive the specific video information through a corresponding control information transmitting-receiving unit and a corresponding transmission medium connected to the corresponding control information transmitting-receiving unit and the relevant video information receiving unit to receive the specific video information, the relevant video information receiving unit outputs the specific video information to the video displaying unit if being directly connected to the video displaying unit, or outputs the specific video information to the video displaying unit through the through line(s) and other video information receiving unit(s) if not being directly connected to the video displaying unit.

The present invention also provides a video transmitting apparatus comprising a plurality of transmission media over which multiplexed video information is transmitted, a video inputting unit for obtaining the video information by photographing video or regenerating accumulated video, a switcher connected to the video inputting unit to output video information from the video inputting unit to a selected route, a plurality of video information transmitting units each for connecting the switcher to a corresponding transmission medium to multiplex video information outputted from the switcher on the corresponding transmission medium to transmit the same, each of the video information transmitting units also being connected to the switcher through a control information outputting line to supply control information to the switcher, a plurality of control information transmitting-receiving units, one or more of which is connected to each of the transmission media to transmit and receive control information enabling a control through the corresponding transmission medium, and a video display requesting unit connected to each of the plural control information transmitting-receiving units to request to transmit specific video information through a corresponding transmission medium, wherein when a user of the video displaying apparatus request to display specific video information through the video display requesting unit, the video display requesting unit requests a relevant video information transmitting unit through a corresponding control information transmitting-receiving unit and a corresponding transmission medium connected to the corresponding control information transmitting-receiving unit and the relevant video information transmitting unit to transmit the specific video information, and the video display requesting unit also requests the switcher through the corresponding control information transmitting-receiving unit, the corresponding transmission medium, the relevant video information transmitting unit and at least one control information outputting line connecting the relevant video information transmitting unit to the switcher to select the relevant video information transmitting unit so as to transmit the specific video information from the relevant video information transmitting unit.

The present invention also provides a video transmitting apparatus comprising a plurality of transmission media over which multiplexed video information is transmitted, a video inputting unit for obtaining video information by photographing video or regenerating accumulated video, a plurality of video information transmitting units, one or more of which is connected to a corresponding transmission medium to multiplex the video information inputted from the video inputting unit on the corresponding transmission medium and transmit the same, the video information transmitting units being connected by through lines to one another to transmit video information from one to another, and any one of the video information transmitting unit being directly connected to the video inputting unit, a plurality of control information transmitting-receiving units, one or more of which is connected a corresponding transmission medium to transmit and receive control information enabling a control through the corresponding transmission medium, and a video display requesting unit connected to each of the plural control information transmitting-receiving units to request to transmit specific video information through a corresponding transmission medium, wherein when a user of the video transmitting apparatus requests to transmit specific video information through the video display requesting unit, the video display requesting unit requests a relevant video information transmitting unit through a corresponding control information transmitting-receiving unit and a corresponding transmission medium connected to the corresponding control information transmitting-receiving unit and the relevant video information transmitting unit to transmit the specific video information, and the relevant video transmitting unit receives the specific information from the video inputting unit if being directly connected to the video inputting unit and outputs the same to the corresponding transmission medium, or receives the specific information from the video inputting unit through other video information transmitting unit(s) and the through line(s) if not being directly connected to the video inputting unit and outputs the same to the corresponding transmission medium.

According to this invention, there are provided a plurality of the video information receiving units connected to the respective transmission media and the switcher for selecting one or a plurality of pieces of video information among video information outputted from the video information receiving units and outputting the selected video information to the video transmitting apparatus of this invention, whereby it is possible to simultaneously supply plural sorts of video larger in number than channel resources possessed by one transmission medium by using a plurality of transmission media, and switch video over a plurality of transmission media.

According to this invention, there are also provided the synchronization signal generating unit for supplying synchronization signals to the transmission media and a synchronization signal detecting unit in the video transmitting apparatus of this invention, it is possible to transmit video without distortion at the time of a switching by synchronizing the synchronization signal in the transmission media.

According to this invention, there is further provided the control information transmitting-receiving units for transmitting/receiving control information enabling a remote control over the transmission media, whereby it is possible to request a switching of video from a place away from the monitor.

BRIEF DESCRIPTION OF THE DRAWINGS

FIG. 1 is a block diagram showing a structure of a video transmitting apparatus according to a first embodiment of this invention;

FIG. 2 is a diagram showing a structure of an example of a switcher in the video transmitting apparatus according to the first embodiment;

FIG. 3 is a diagram showing a structure of another example of the switcher having a plurality of outputs according to the first embodiment;

FIG. 4 is a block diagram showing a structure of a video transmitting apparatus according to a second embodiment of this invention;

DETAILED DESCRIPTION OF PREFERRED EMBODIMENTS

Figure 5:
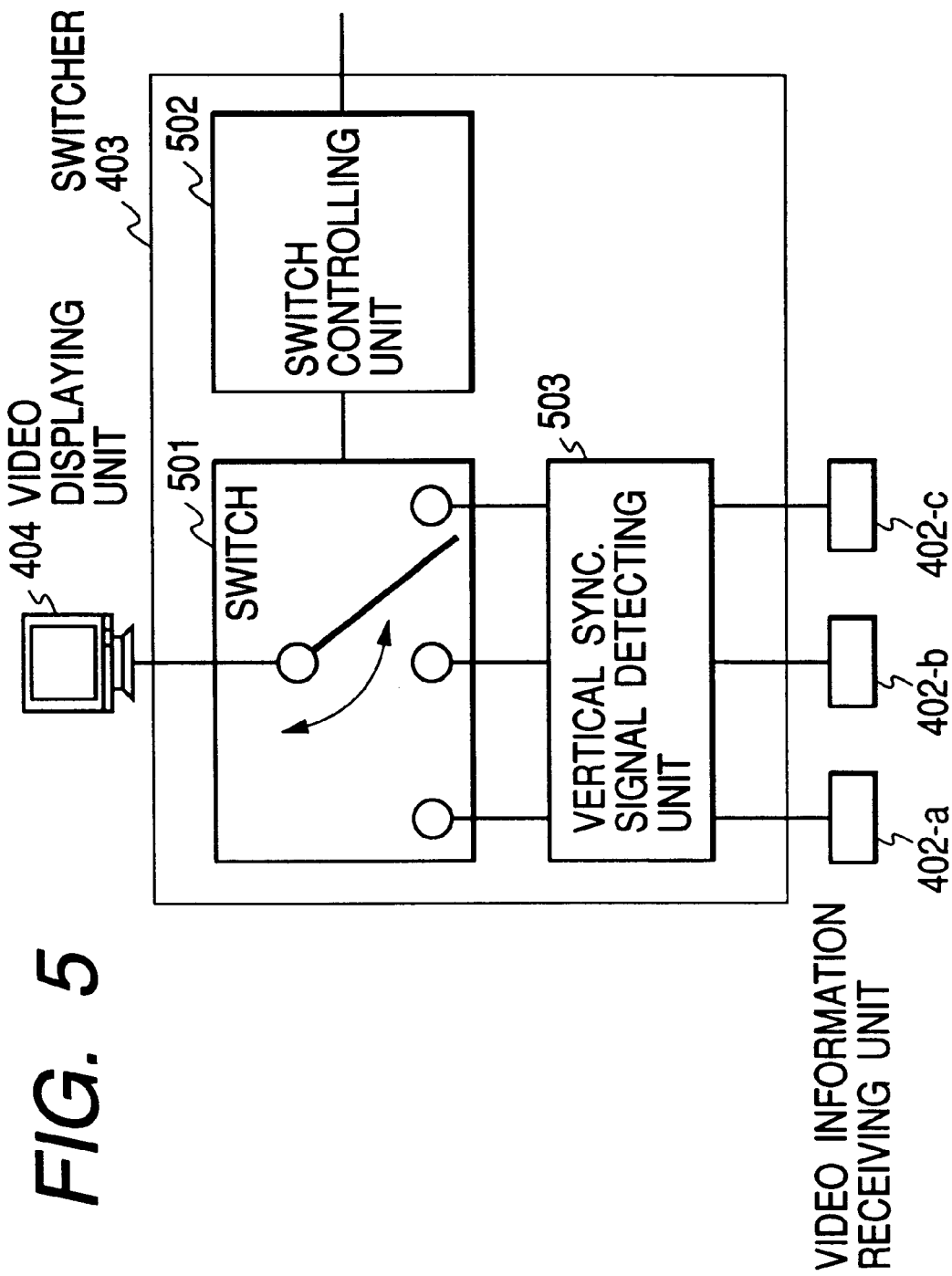
FIG. 5 is a diagram showing a structure of a switcher in the video transmitting apparatus according to the second embodiment.

Hereinafter, description will be made of preferred embodiments of this invention with reference to FIGS. 1 through 15.

(a) Description of First Embodiment Now, a first embodiment of this invention will be described with reference to FIGS. 1 through 3.

FIG. 1 is a block diagram showing a structure of a video transmitting apparatus according to the first embodiment of this invention. In FIG. 1, reference numeral 101-a through 101-c denote a plurality of transmission media on which video information is multiplexed and transmitted, 102-1 through 102-c video information receiving units each of which receives video information on a specific transmission band (channel) of the video information multiplexed on the corresponding transmission medium 101-a, 101-b or 101-c and outputs contents thereof, 103 a switcher which selects one or plural pieces of the video information among the video information outputted from the plurality of video information receiving units 102-a through 102-c and outputs the selected video information, 104 a video displaying unit which displays the video information selected by the switcher 103, 105 a video display requesting unit which is connected to the switcher 103 and each of the video information receiving units 102-1 through 102-c to make a request to display specific video information on the video displaying unit 104, and 106-a1 and 106-a2, 106-b1 and 106-b2, and 106-c1 and 106-c2 video inputting units each of which is used to input the video information.

As an example of the video displaying unit 104, there is a monitor, a TV or the like. As an example of the transmission medium 101, there is a CATV coaxial cable or a digital video/sound network cable or the like, on which information is multiplexed using a frequency division multiplexing technique or a time division multiplexing technique. As an example of the video inputting unit 106, there is a TV camera, a video player, a program transmitting apparatus or the like. Representative examples of the video display requesting unit 105 include a personal computer, a control console or the like. In this embodiment, there is applied a monitor as the video outputting unit 104, and a camera as the video inputting device 106.

FIG. 2 is a diagram showing a structure of the switcher 103 according to this embodiment. In FIG. 2, reference numeral 201 denotes a switch which selects one terminal among terminals connected to the respective video information receiving units 102-a through 102-c, and 202 a switch controlling unit receiving a control request from the outside to operate the switch 201.

FIG. 3 is a diagram showing a structure of another example of the switcher 103 according to this embodiment in the case where the switcher 103 has a plurality of outputs for, for example, respective video display units. In FIG. 3, reference numeral 301 denotes a switch which selects a plurality of terminals of the video information receiving unit 102-a through 102-c to connect them, and 302 a switch controlling unit receiving a control request form the outside to operate the switch 301.

Next, description will be made of an operation of the video transmitting apparatus shown in FIGS. 1 through 3.

In the video transmitting apparatus shown in FIG. 1, video information is transmitted from the cameras 106-a1 and 106-a2 on channels 1 and 5 over the transmission medium 101-a, video information is transmitted from the cameras 106-b1 and 106-b2 on channels 3 and 5 over the transmission medium 101-b, and video information is transmitted from the cameras 106-c1 and 106-c2 on channels 5 and 7 over the transmission medium 101-c.

When the user makes a request to display video of the camera 106-c2 on the monitor 104 through the video display requesting unit 105, the video display requesting unit 105 instructs the video information receiving unit 102-c, which can receive the video information through the transmission medium 101-c to which the camera 106-c2 sends out video, to receive the video information on the channel 7 sent out from the camera 106-c2. According to this embodiment, the video display requesting unit 105 directly makes a request to the video information receiving unit 102-a, 102-b or 102-c since being directly connected to each of all of the video information receiving units 102-a through 102-c. In response to the request, the video information receiving unit 102-c starts receiving the designated video information (on the channel 7), and outputs the received video information to the switcher 103. Successively, the video display requesting unit 105 instructs the switcher 103 to select the video information received by the video information receiving unit 102-c. According to this embodiment, the video display requesting unit 105 directly makes a request to the switcher 103 since being directly connected to the switcher 103. In response to the instruction, the switch controlling unit 202 in the switcher 103 operates the switch 201 to select the video information supplied from the video information receiving unit 102-c and outputs it to the monitor 104. The video information obtained by the camera 106-c2 is thereby displayed on the monitor 104.

When the user makes a request to display video obtained by the camera 106-b1 on the monitor 104, the video display requesting unit 105 instructs the video display receiving unit 102-b to receive the video information on the channel 3 sent out from the camera 106-b1. Successively, the video display requesting unit 105 instructs the switcher 103 to select the video information received by the video information receiving unit 102-b. The video information receiving unit 102-b and the switcher 103 perform predetermined operations in response to the instructions, whereby the video information obtained by the camera 106-b1 is displayed on the monitor 104.

If it is desired to simultaneously monitor plural sorts of video by a plurality of the monitors 104, a set of the switcher 103 and the video information receiving units 102-a through 102-c is prepared for each of the monitors 104, whereby plural sorts of video are displayed.

If the switcher 103 has a plurality of outputs as shown in FIG. 3, the video display requesting unit 105 separately requests each of the switches 301 of the switcher 103 to be connected to any one of the video information receiving units 102-a, 102-b or 102-c, whereby plural sorts of video are displayed.

According to this embodiment, there are provided a plurality of the video information receiving units 102-a through 102-c connected to the plurality of the transmission media 101-a through 101-c, respectively, and the switcher 103 for selecting one or a plurality of pieces of video information among the video information outputted from the video information receiving units 102-a through 102-c. It is thereby possible to simultaneously supply plural sorts of video larger in number than channel resources possessed by one transmission medium using a plurality of transmission media, and switch the video over a plurality of transmission media. Accordingly, this embodiment is very practical.

(b) Description of Second Embodiment

Now, description will be made of a second embodiment of this invention with reference to FIGS. 4 and 5.

FIG. 4 is a block diagram showing a structure of a video transmitting apparatus according to the second embodiment of this invention. In FIG. 4, reference numeral 401-*a* trough 401-*c* denote a plurality of transmission media, 402-*a* through 402-*c* video information receiving units, 403 a switcher, 404 a video displaying unit, 405 a video display requesting unit, 406-*a*1 and 406-*a*2, 406-*b*1 and 406-*b*2, and 406-*c*1 and 406-*c*2 video inputting units, which are similar to those according to the first embodiment. Reference numeral 407 denotes a clock generator for supplying a clock to the transmission media 401-*a* through 401-*c* in order to accomplish vertical synchronization of video multiplexed and transmitted.

Similarly to the first embodiment, here are assumed a monitor as the video outputting unit 404 and a camera as the video inputting unit 406.

FIG. 5 is a diagram showing a structure of the switcher 403 according to the second embodiment. In FIG. 5, reference numeral 501 denotes a switch for selecting a terminal to be connected to any one of the video information receiving units 402-*a*, 402-*b* or 402-*c*, 502 a switch controlling unit receiving a control request form the outside to operate the switch 501, and 503 a vertical synchronization signal detecting unit for detecting a vertical synchronization signal multiplexed on the transmission media 401-*a* through 401-*c*.

Next, description will be made of an operation of the video transmitting apparatus with the structure shown in FIGS. 4 and 5.

Here, conditions of the operation such as video sent out to each of the transmission media and the like are the same as the first embodiment. However, the clock generator 407 is connected to each of the transmission media 401-*a* through 401-*c* to supply a clock to the same so that transmit images of the video information multiplexed and transmitted are in vertical synchronization. In addition, a vertical synchronization signal is also multiplexed on each of the transmission medium 401-*a* through 401-*c* and transmitted thereon.

When the user makes a request to display video obtained by the camera 406-*c*2 on the monitor 404 by operating the video display requesting unit 405, an operation at this time is almost similar to the first embodiment, excepting that the switcher 403 instructed by the video display requesting unit 405 to select video information received by the information receiving unit 402-*c* detects a vertical synchronization signal on the transmission medium 401-*c* by means of the vertical synchronization signal detecting unit 503 to operate the switch 501 at a timing of the vertical synchronization signal, whereby the video information is not switched in the middle of the screen so that the video obtained by the camera 406-*c*2 is displayed without distortion on the monitor 404.

If it is desired to simultaneously monitor plural sorts of video on the respective monitors 404, and if the switcher 403 has a plurality of outputs, it is possible to cope with them in manners similar to those according to the first embodiment.

In this embodiment, the vertical synchronization signal is applied as a synchronization signal since a screen is used as a unit for switching the video. If switching of the video is performed by less than one screen, that is, a half or a one-third of a screen, as a unit, it is alternatively possible to employ a horizontal synchronization signal (by providing a clock generator for accomplishing horizontal synchronization of the transmit images and a horizontal synchronization signal detecting unit for detecting a horizontal synchronization signal).

According to this embodiment, there are additionally provided the clock generator 407 for supplying a clock to each of the transmission media 401-*a* through 401-*c* in order to accomplish vertical synchronization of transmit images multiplexed and transmitted, and the vertical synchronization signal detecting unit 503 for detecting a vertical synchronization signal in the switcher 403 of the video transmitting apparatus according to this embodiment, thereby synchronizing the vertical synchronization signals on the transmission media 401-*a* through 401-*c* and detect the synchronization signal.

Therefore, it is possible to transmit video without distortion of the video at the time of a switching to the video information desired to be displayed. Accordingly, this embodiment is very practical.

(c) Description of Third Embodiment

Next, description will be made of a third embodiment of this invention referring to FIG. 6.

Figure 6:
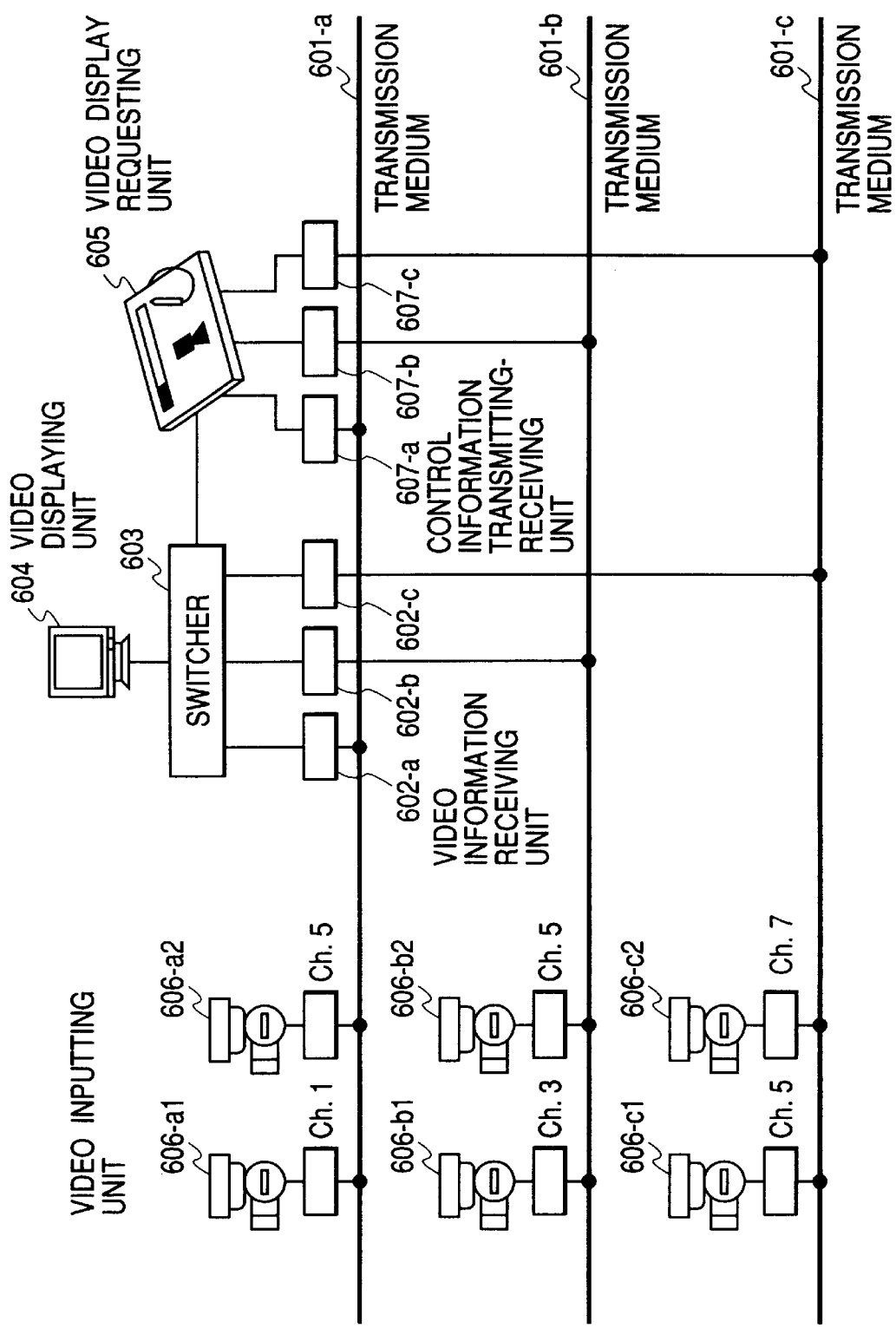
FIG. 6 is a block diagram showing a structure of a video transmitting apparatus according to a third embodiment of this invention.

FIG. 6 is a block diagram showing a structure of a video transmitting apparatus according to the third embodiment of this invention. In FIG. 6, reference numerals 601-*a* through 601-*c* denote a plurality of transmission media, 602-*a* through 602-*c* video information receiving units, 603 a switcher, 604 a video displaying unit, which are similar to those according to the first embodiment. Reference numeral 605 denotes a video display requesting unit connected to the switcher 603 and each of control information transmitting-receiving units 607-*a* through 607-*c* to request to display specific video information on the video displaying unit 604, 606-*a*1 and 606-*a*2, 606-*b*1 and 606-*b*2, and 606-*c*1 and 606-*c*2 video inputting units for inputting video information, and 607-*a* through 607-*c* the control information transmitting-receiving units connected to the respective transmission media 601-*a* through 601-*c* to transmit/receive control information which enable a remote control through the transmission media 601-*a* through 601-*c*, that is, information which can operate the apparatus through the transmission media 601-*a* through 601-*c* even if the apparatus is not directly connected, which are represented by RF (Radio Frequency) modems, broad-band modems, CATV modems, or the like.

Similarly to the first embodiment, here is assumed a monitor as the video displaying unit 604 and a camera as the video inputting unit 606.

Now, description will be made of an operation of the video transmitting apparatus with the structure shown in FIG. 6. Incidentally, conditions of the operation such as video sent out to each of the transmission media are similar to those according to the first embodiment.

When the user makes a request to display video obtained by the camera 606-*c*2 on the monitor 604 through the video display requesting unit 605, an operation at this time is similar to that according to the first embodiment, excepting that when the video display requesting unit 605 instructs the video information receiving unit 602-*c*, which can receive the video information over the transmission medium 601-*c* to which the camera 606-*c*2 sends video, to receive video information on the channel 7 sent out from the camera 606-*c*2, the video display requesting unit 605 requests the control information transmitting-receiving unit 607-*c* to send a receive instruction to the video information receiving unit 602-*c* since the video display requesting unit 605 is connected to the video information receiving unit 602-*c* via the control information transmitting-receiving unit 607-*c* and the transmission medium 601-*c*, according to this embodiment. The control information transmitting-receiving unit 607-*c* transmits the receive instruction to the video information receiving unit 602-*c* via the transmission media 601-*c*.

Following that, the video display requesting unit 605 instructs the switcher 603 to select video information received by the video information receiving unit 602-*c*. According to this embodiment, the video display requesting unit 605 directly instructs it since being directly connected to the switcher 603, similarly to the first embodiment. Whereby, the video obtained by the camera 606-*c*2 is displayed on the monitor 604.

If it is desired to monitor plural sorts of video by preparing a plurality of the monitors 604, or if the switcher 603 has a plurality of outputs, it is possible to cope with them in manners similar to those of the first embodiment.

As described in the second embodiment (refer to FIGS. 4 and 5), by providing a clock by, for example, the clock generating unit 407 (synchronization signal generating unit), the video information multiplexed and transmitted on the transmission media 601-*a* through 601-*c* is synchronized (vertical synchronization, horizontal synchronization, or the like), and synchronization signals are also multiplexed and transmitted. Further, each of the video information receiving units 602-*a* through 602-*c* switches at a timing of the above synchronization signal, whereby video is transmitted without distortion at the time of a switching.

Accordingly, this embodiment can produce the same advantage as the first embodiment. In addition, according to this embodiment, there are provided the control information transmitting-receiving units 607-*a* through 607-*c* connected to the respective transmission media 601-*a* through 601-*c* to transmit and receive control information enabling a remote control through the transmission media 601-*a* through 601-*c*, and the video display requesting unit 605 is connected to the switcher 603 and each of the control information transmitting-receiving units 607-*a* through 607-*c*. If there are a plurality of monitors (video displaying units), it is unnecessary to connect the video information receiving units equal in number to the transmission media, each set of which is connected to the monitor via the switcher, to the video display requesting unit 605.

If any one of the control information transmitting-receiving units 607-*a* through 607-*c* (or the video information receiving units 602-*a* through 602-*c*) is in trouble, it is possible to instruct the switcher 603 not to select the video information receiving unit 602-*a*, 602-*b* or 602-*c* connected to the troubled control information transmitting-receiving unit (or the video information receiving unit). As above, this embodiment is very practical.

(d) Description of Fourth Embodiment

Next, description will be made of a fourth embodiment of this invention referring to FIG. 7.

Figure 7:
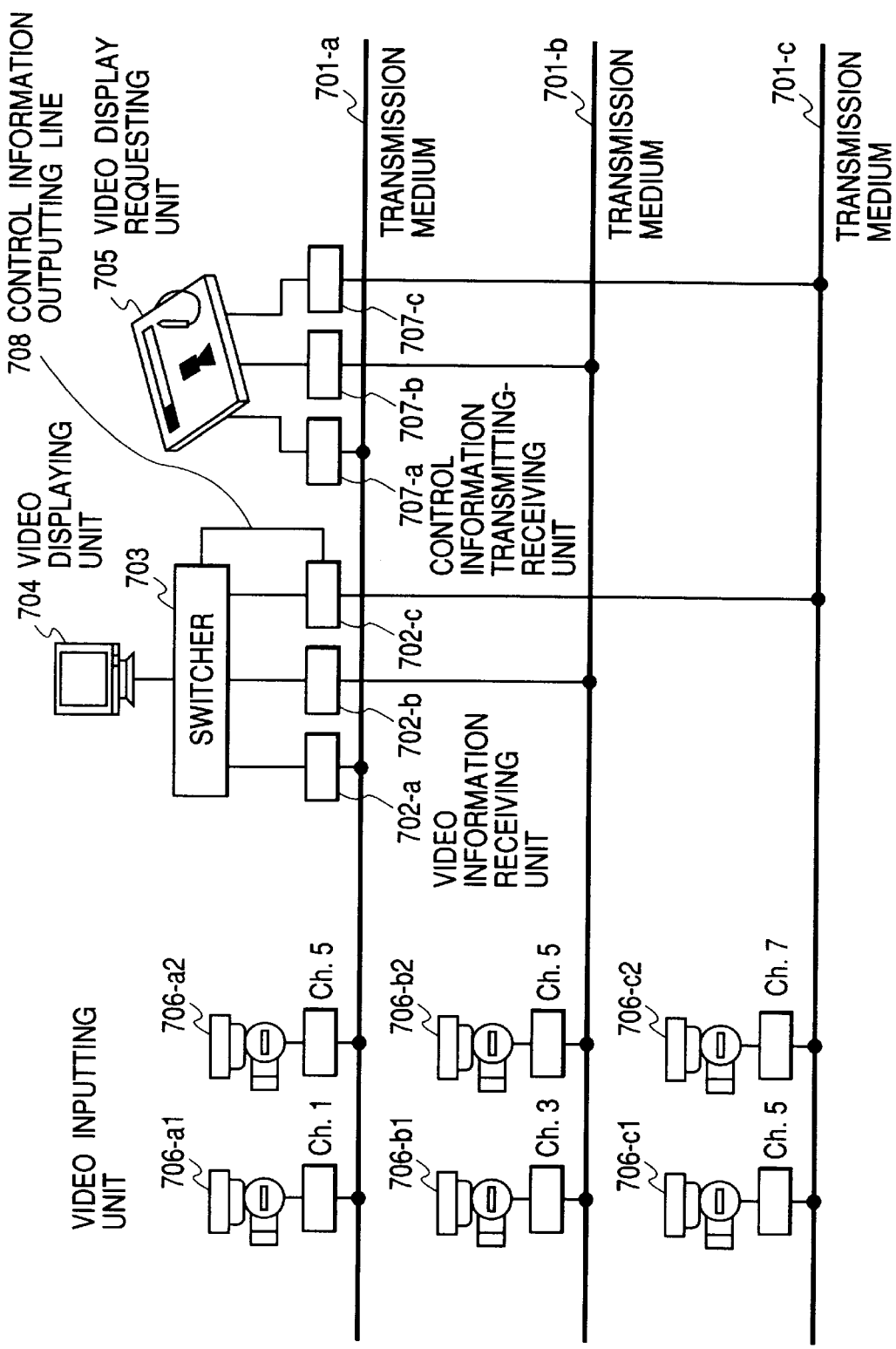
FIG. 7 is a block diagram showing a structure of a video transmitting apparatus according to a fourth embodiment of this invention.

FIG. 7 is a block diagram showing a structure of a video transmitting apparatus according to the fourth embodiment of this invention. In FIG. 7, reference numeral 701-*a* through 701-*c* denote a plurality of transmission media, 702-*a* through 702-*c* video information receiving units, 703 a switcher, 704 a video displaying unit, which are similar to those according to the first embodiment. Reference numeral 705 denotes a video display requesting unit connected to control information transmitting-receiving units 707-*a* through 707-*c* to request to display specific video information on the video displaying unit 704, 706-*a*1 and 706-*a*2, 706-*b*1 and 706-*b*2 and 706-*c*1 and 706-*c*2 video inputting units for inputting video information into the system, 707-*a* through 707-*c* control information transmitting-receiving units connected to the respective transmission media 701-*a* through 701-*c* to transmit/receive control information enabling a remote control through the transmission media 701-*a* through 701-*c*, that is, information which can operate the apparatus through the transmission media without direct connection, and 708 a control information outputting line connecting the video information receiving units 702-*a* through 702-*c* to the switcher 703 through which the control information transmitted from the control information transmitting-receiving units 707-*a* through 707-*c* is supplied to the switcher 703. It is possible to provide a plurality of the control information outputting lines, the number of which is equal to or less than the number of the video information receiving units 702.

Incidentally, here are assumed a monitor as the video outputting unit 704, and a camera as the video inputting unit 706, similarly to the first embodiment.

Next, description will be made of an operation of the video transmitting apparatus with the above structure shown in FIG. 7. Conditions of the operation such as video transmitted on the transmission media 701-*a* through 701-*c* and the like are the same as the first embodiment.

When the user makes a request to display video obtained by the camera 706-*c*2 on the monitor 704 through the video display requesting unit 705 similarly to the case of the first embodiment, an operation at this time is similar to that according to the first embodiment, excepting that when the video display requesting unit 705 instructs the video information receiving unit 702-*c*, which can receive video information transmitted over the transmission medium 701-*c* to which the camera 706-*c*2 sends video which is an object to be displayed, to receive video information on the channel 7 from the camera 706-*c*2, the video display requesting unit 705 requests the control information transmitting-receiving unit 707-*c* to send a receive instruction to the video information receiving unit 702-*c* since being connected to the video information receiving unit 702-*c* via the control information transmitting-receiving unit 707-*c* and the transmission medium 701-*c*. The control information transmitting-receiving unit 707-*c* transmits the receive instruction to the video information receiving unit 702-*c* via the transmission medium 701-*c*.

Following that, when the video display requesting unit 705 instructs the switcher 703 to select video information received by the video information receiving unit 702-*c*, the video display requesting unit 705 requests the control information transmitting-receiving unit 707-*c* to transmit a switch instruction to the switcher 703 since the video display requesting unit 705 is connected to the switcher 703 via the control information transmitting-receiving unit 707-*c* and the transmission medium 701-*c* and the control information outputting line 708 in this embodiment. The control information transmitting-receiving unit 707-*c* transmits the switch instruction to the switcher 703 via the transmission medium 701-*c*, the video information receiving unit 702-*c* and the control information outputting line 708. Whereby, the video of the camera 706-*c*2 is displayed on the monitor 704.

If it is desired to monitor plural sorts of video by preparing a plurality of the monitors 704, or if the switcher 703 has a plurality of outputs, it is possible to cope with them in manners similar to those according to the first embodiment.

As described in the second embodiment (refer to FIGS. 4 and 5), by providing a clock by, for example, the clock generating unit 407 (synchronization signal generating unit), the video information multiplexed and transmitted on the transmission media 701-*a* through 701-*c* is synchronized (vertical synchronization, horizontal synchronization, or the like), and synchronization signals are also multiplexed and transmitted. Further, each of the video information receiving units 602-*a* through 602-*c* switches at a timing of the above synchronization signal, whereby video is transmitted without distortion at the time of a switching.

According to this embodiment, the control information transmitting-receiving units 702-*a* through 702-*c* connected to the respective transmission media 701-*a* through 701-*c* to transmit/receive control information enabling a remote control via the transmission media 701-*a* through 701-*c*, and the video display requesting unit 705 is connected to the switcher 703 and the control information transmitting-receiving units 707-*a* through 707-*c*, whereby it is possible to connect the video display requesting unit 705 to the video displaying unit 704 via the transmission media 701-*a* through 701-*c*, that is, it is possible to connect the video display requesting unit 705 to the video displaying unit 704 even from a remote place. Accordingly, this embodiment can produce a remarkable practical effect since a switching of video can be done from a place away from the video displaying unit 702 such as a monitor.

(e) Description of Fifth Embodiment

Next, description will be made of a fifth embodiment of this invention referring to FIGS. 8, 9 and 10.

Figure 8:
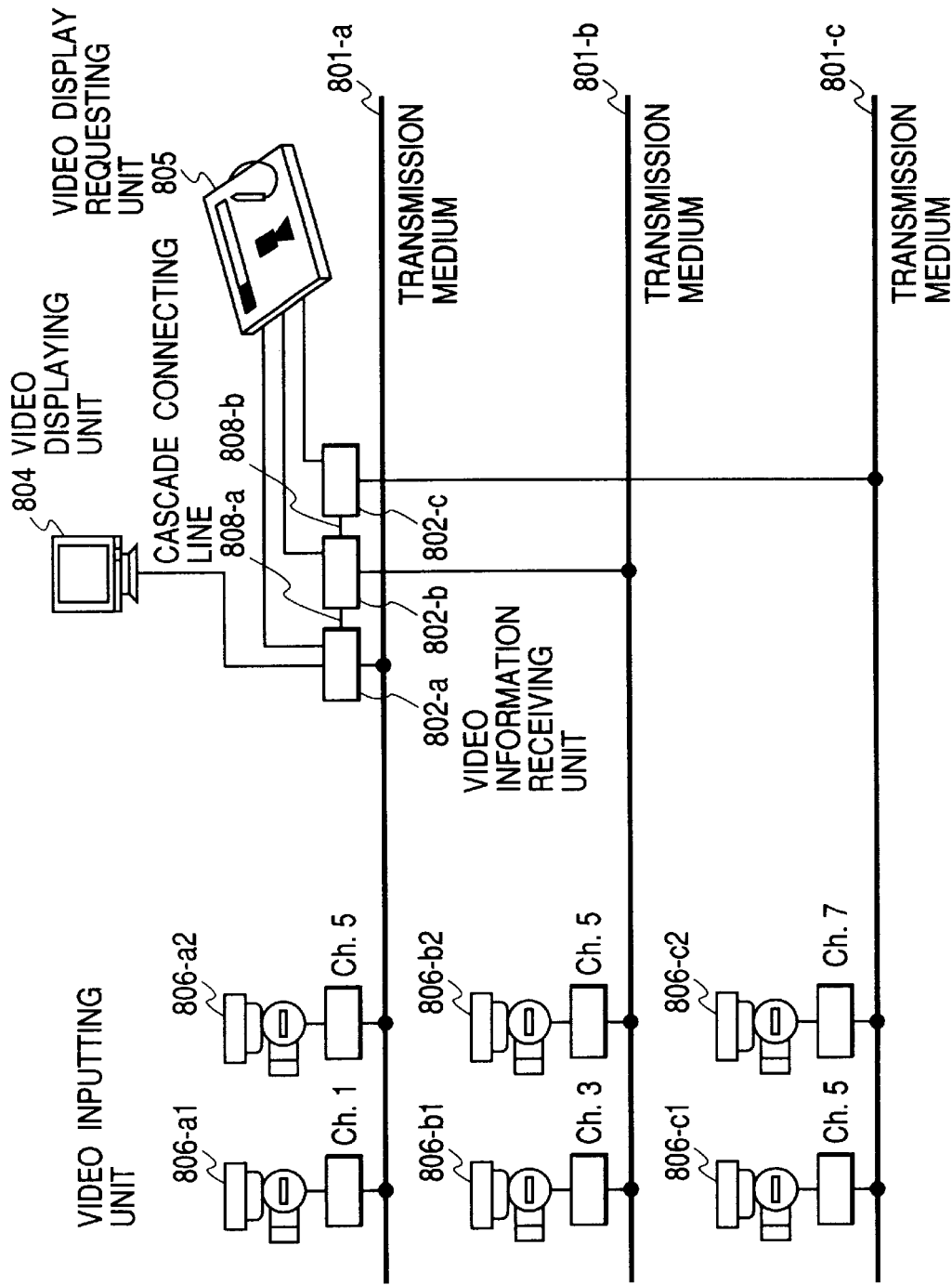
FIG. 8 is a block diagram showing a structure of a video transmitting apparatus according to a fifth embodiment of this invention.

FIG. 8 is a block diagram showing a structure of a video transmitting apparatus according to the fifth embodiment of this invention. In FIG. 8, reference numeral 801-*a* through 801-*c* denote a plurality of transmission media on which video information is multiplexed and transmitted, 802-*a* through 802-*c* video information receiving units each for receiving video information of a specific transmission band (channel) among video information multiplexed on the transmission medium 801-*a*, 801-*b* or 801-*c* and outputting contents of the video information, 804 a video displaying unit connected to any one of the video information receiving units 802-*a* through 802-*c* to display video information selected by the video information receiving units 802-*a* through 802-*c*, 805 a video display requesting unit connected to each of the video information receiving units 802-*a* through 802-*c* to request to display specific video information on the video displaying unit 804, and 806-*a*1 and 806-*a*2, 806-*b*1 and 806-*b*2 and 806-*c*1 and 806-*c*2 video inputting units for inputting video information to the system.

Similarly to the first embodiment, here is assumed a monitor as the video outputting unit 804 and a camera as the video inputting unit 806.

Figure 9:
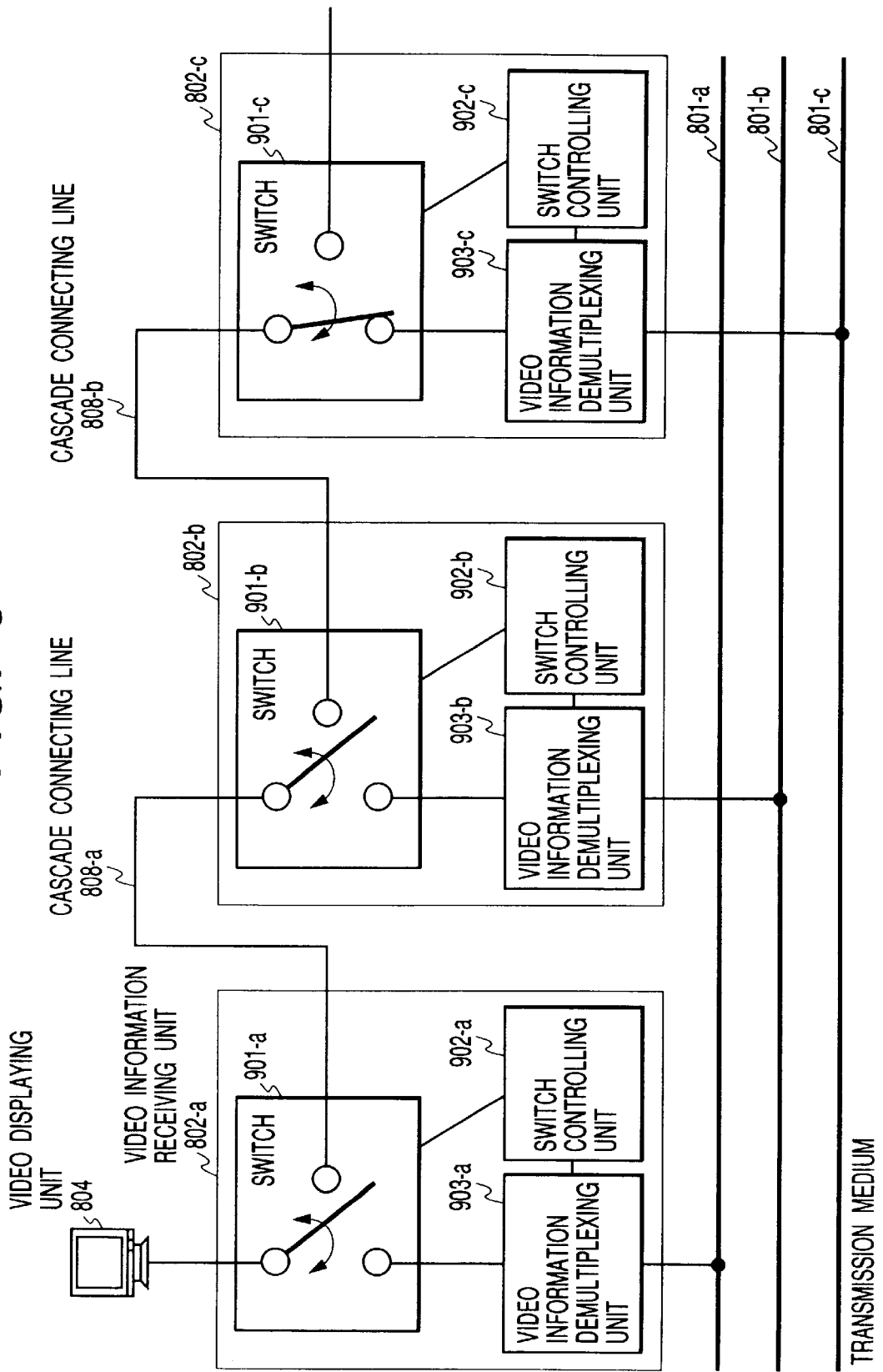
FIG. 9 is a diagram showing structures of video information receiving units in the video transmitting apparatus.

FIG. 9 is a block diagram showing structures of the video information receiving units 802-*a* through 802-*c* according to the fifth embodiment. In FIG. 9, reference numeral 901-*a* through 901-*c* denote switches each for selecting whether video information is received through a corresponding cascade connecting line 808-*a* or 808-*b* (that is, a connecting line through which a signal from a video player system is transmitted when video of the video player system is watched, or a signal received by an antenna is transmitted through an inside of the video player system when video of a television receiver system is watched, represented by a through line used when the television receiver and the video player system are connected), or video information is received through the corresponding transmission medium 801-*a*, 801-*b* or 801-*c*, and connecting. Reference numerals 902-*a*, 902-*b* and 902-*c* denote switch controlling units each receiving a control request from the outside to operate the corresponding switch 901-*a*, 901-*b* or 901-*c*. Reference numeral 903-*a*, 903-*b* and 903-*c* denote video signal demultiplexing circuits each for receiving video information from a transmission band (channel) that should be received from the corresponding transmission medium 801-*a*, 801-*b* or 801-*c* to demultiplex the video information.

Figure 10:
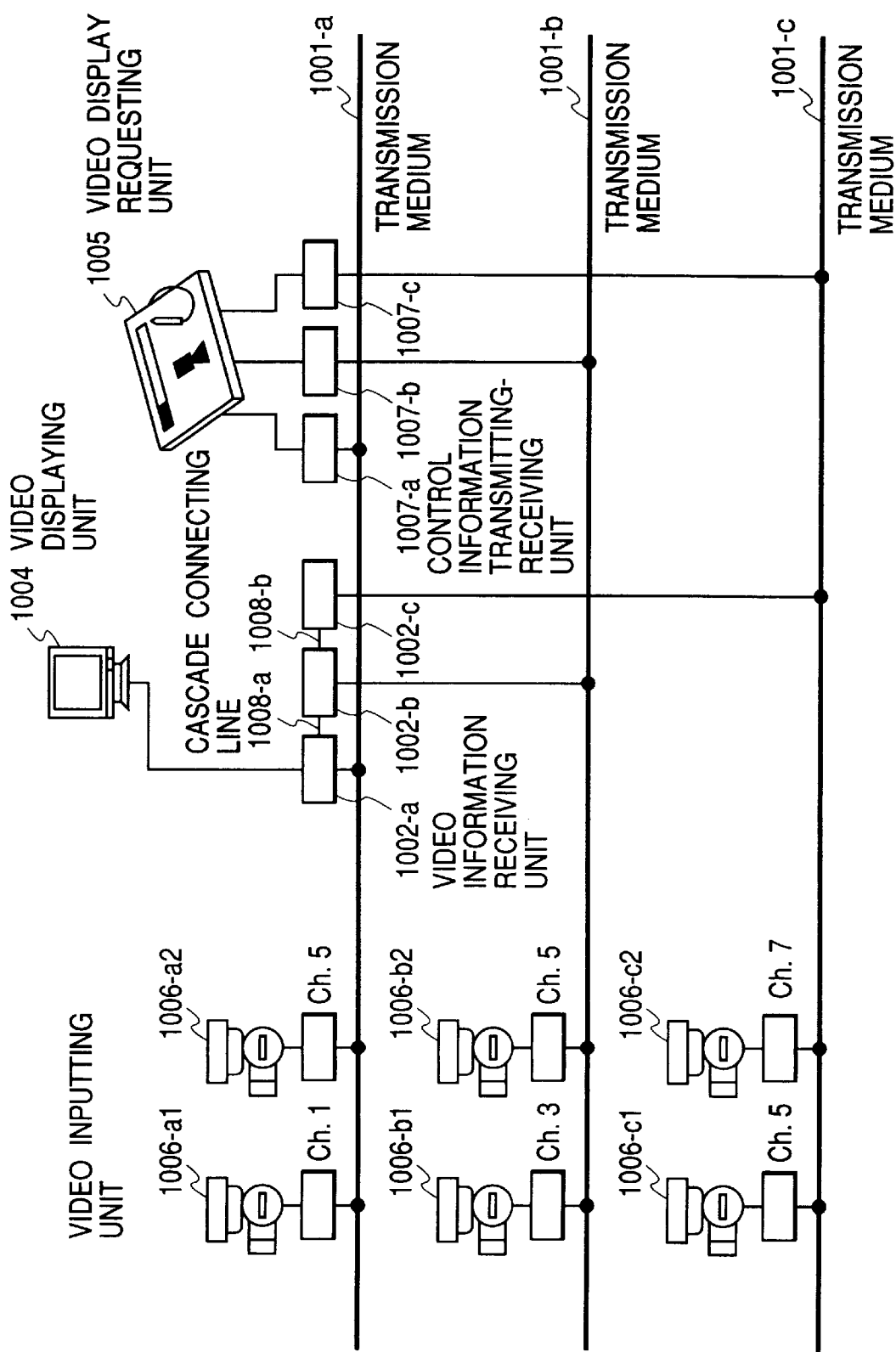
FIG. 10 is a block diagram showing a structure of another example of the video transmitting apparatus according to the fifth embodiment.

FIG. 10 is a block diagram showing another structure of the video transmitting apparatus according to the fifth embodiment. In FIG. 10, reference numerals 1001-*a* through 1001-*c* denote a plurality of transmission media, 1002-*a* through 1002-*c* video information receiving units, 1004 a video displaying unit, 1005 a video display requesting unit connected to control information transmitting-receiving units 1007-*a* through 1007-*c* to request to display specific video information on the video displaying unit 1004. Reference numerals 1006-*a*1 and 1006-*a*2, 1006-*b*1 and 1006-*b*2 and 1006-*c*1 and 1006-*c*2 denote video inputting units for inputting video information, and 1007-*a* through 1007-*c* the control information receiving units connected to the respective transmission media 1007-*a* through 1007-*c* to transmit/receive control information over the transmission media 1007-*a* through 1007-*c*.

Next, description will be made of an operation of the video transmitting apparatus with the structure shown in FIGS. 8 through 10.

Conditions of the operation such as video transmitted over the transmission media are the same as the first embodiment.

When the user requests to display video obtained by the camera 806-*c*2 on the monitor 804 through the video display requesting unit 805, the video display requesting unit 805 instructs the video information receiving unit 802-*c* which can receive the video information through the transmission medium 801-*c* to which the camera 806-*c*2 sends video, which is an object to be displayed, to receive video information on the channel 7 sent out from the camera 806-*c*2. The video display requesting unit 805 directly instructs the video information receiving unit 802-*c* since being directly connected to each of all of the video information receiving units 802-*a* through 802-*c*. The video information demultiplexing circuit 903-*c* in the video information receiving unit 802-*c* having been received the instruction starts receiving the video information (on the channel 7).

Following that, the video display requesting unit 805 requests the video information receiving unit 802-*c* to select a transmission medium's side as an output between a cascade connecting line's side and the transmission medium's side. In the video information receiving unit 802-*c* having received the instruction, the switch controlling unit 902-*c* operates the switch 901-*c* to select video information obtained through the transmission medium 801-*c* and output the same. The video display requesting unit 805 also requests the video information receiving units 802-*a* and 802-*b* to select the cascade connecting line's side as inputs. In the video information receiving units 802-*a* and 802-*b* having received the instruction, the switch controlling units 902-*a* and 902-*b* operate the respective switches 901-*a* and 901-*b* to select video information obtained through the respective cascade connecting lines 808-*a* and 808-*b*. Whereby, video obtained by the camera 806-*c*2 is displayed on the monitor 804.

When the user requests to display video obtained by the camera 806-*b*1 on the monitor 804, the video display requesting unit 805 requests the video information receiving unit 802-*b* to receive video information on the channel 3 send out from the camera 806-*b*1, and select and output the video information fed through the transmission medium

801-*b*. Following that, the video display requesting unit 805 instructs the video information receiving unit 802-*a* to select video information fed through the cascade connecting line 808-*a* and output the same. The video information receiving units 802-*a* and 802-*b* perform predetermined operations, whereby video of the camera 806-*b*1 is displayed on the monitor 804.

If it is desired to monitor plural sorts of video by preparing a plurality of the monitors 804, a set of the video information receiving units 802-*a* through 802-*c* is prepared for each of the plurality of the monitors 804, whereby a plurality of videos are available.

Further, it is possible to provide the control information transmitting-receiving units 1007-*a* through 1007-*b* connected to the respective transmission media 1001-*a* through 1001-*c* for transmitting/receiving control information over the transmission media 1001-*a* through 1001-*c*, and connect the video display requesting unit 1005 to the control information transmitting-receiving units 1007-*a* through 1007-*c*, whereby a switching of video can be done from a remote place.

As described in the second embodiment (refer to FIGS. 4 and 5), by providing a clock by, for example, the clock generating unit 407 (synchronization signal generating unit), the video information multiplexed and transmitted on the transmission media is synchronized (vertical synchronization, horizontal synchronization, or the like), and synchronization signals are also multiplexed and transmitted. Further, each of the video information receiving unit 802-*a* through 802-*c* or 1002-*a* through 1002-*c* switches at a timing of the above synchronization signal, whereby video is transmitted without distortion at the time of a switching.

According to this embodiment, the video information receiving units 802-*a* thorugh 802-*c* or 1002-*a* through 1002-*c* are connected by the cascade connecting lines 808-*a* and 808-*b* or 1008-*a* and 1008-*b*, and each of the video information receiving units 802-*a* through 802-*c* or 1002-*a* through 1002-*c* has a function of selecting whether the video information is received from the transmission media, or from the cascade connecting line, so that the same advantage as the first embodiment is realized without a switcher. By further providing the control information receiving units 1007-*a* through 1007-*c*, it is possible to switch video from a remote place similarly to the fourth embodiment.

(f) Description of Sixth Embodiment

Next, description will be made of a sixth embodiment of this invention referring to FIGS. 11, 12 and 13.

Figure 11:
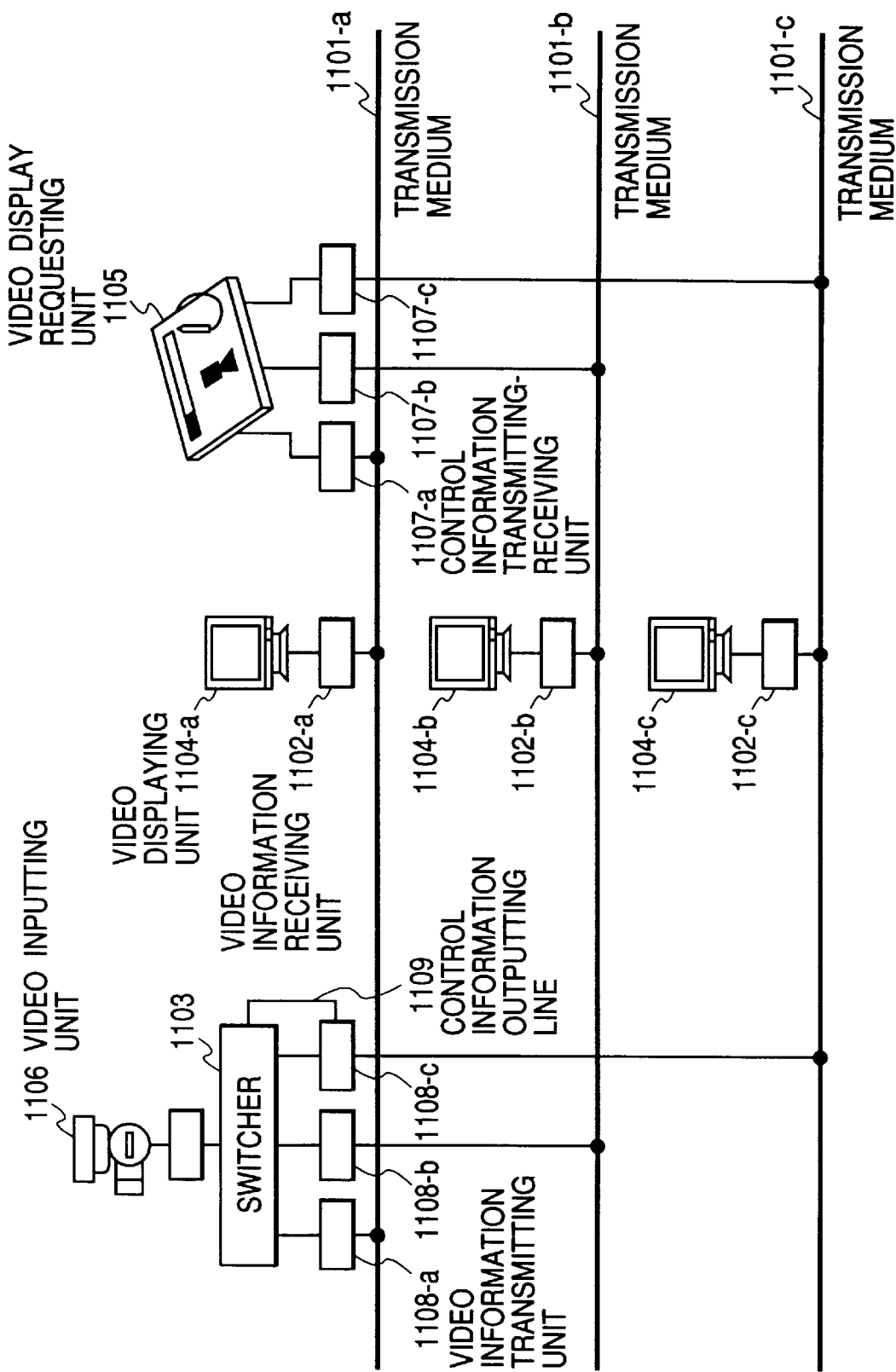
FIG. 11 is a block diagram showing a structure of a video transmitting apparatus according to a sixth embodiment of this invention.

FIG. 11 is a block diagram showing a structure of a video transmitting apparatus according to the sixth embodiment of this invention. In FIG. 11, reference numerals 1101-*a* through 1101-*c* denote a plurality of transmission media on which video information is multiplexed and transmitted, 1102-*a* through 1102-*c* video information receiving units each for receiving video information in a specific transmission band (channel) among video information multiplexed on each of the transmission media 1101-*a* through 1101-*c* and outputting contents of the video information, 1104-*a* through 1104-*c* video displaying units for displaying the video information, 1105 a video display requesting unit connected to each of control information transmitting-receiving units 1007-*a* through 1007-*c* to request to display specific video information on any one of the video displaying units 1104-*a* through 1104-*c* when looked from a user's viewpoint, or request to send specific video information to the transmission medium 1101-*a* through 1101-*c* when looked from an apparatus's viewpoint, 1106 a video inputting unit for inputting video information. Reference numerals 1107-*a* through 1107-*c* denote the control information transmitting-receiving units connected to the respective transmission media 1101-*a* through 1101-*c* to transmit/receive control information enabling a remote control through the transmission media 1101-*a* through 1101-*c*, that is, information enabling an operation through the transmission media 1101-*a* through 1101-*c* even without direct connections, 1108-*a* through 1108-*c* video information transmitting units each for modulating video information using a specific transmission band (channel) to multiplex and transmit the modulated video information on the corresponding transmission medium 1101-*a*, 1101-*b* or 1101-*c*, and 1103 a switcher for selecting video information obtained by one or a plurality of video inputting units and outputting the selected video information to an arbitrary video information transmitting unit 1108-*a*, 1108-*b* or 1108-*c*, and 1109 a control information outputting line connecting the video information transmitting units 1108-*a* through 1108-*c* to the switcher 1103 through which the control information transmitted from the control information transmitting-receiving units 1107-*a* through 1107-*c* is supplied to the switcher 1103. It is possible to provide a plurality of the control information outputting lines, the number of which is equal to or less than the number of the video information transmitting units 1108.

Similarly to the first embodiment , here are assumed monitors as the video outputting units 1104-*a* through 1104-*c* and a camera as the video inputting unit 1106.

Figure 12:
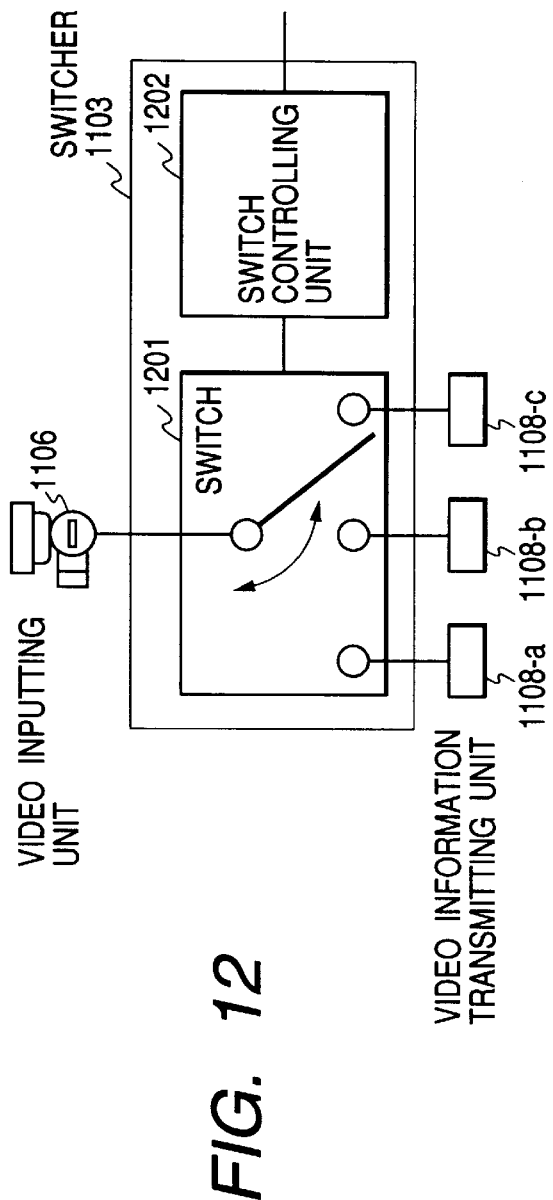
FIG. 12 is a diagram showing a structure of a switcher in the video transmitting apparatus according to the sixth embodiment.

FIG. 12 shows a structure of the switcher 1103 according to the sixth embodiment. In FIG. 12, reference numeral 1201 denotes a switch for selecting one terminal among terminals of the video information transmitting unit 1108-*a*, 1108-*b* or 1108-*c* to connect the same, and 1202 a switch controlling unit for receiving a control request from the outside to operate the switch 1201.

Figure 13:
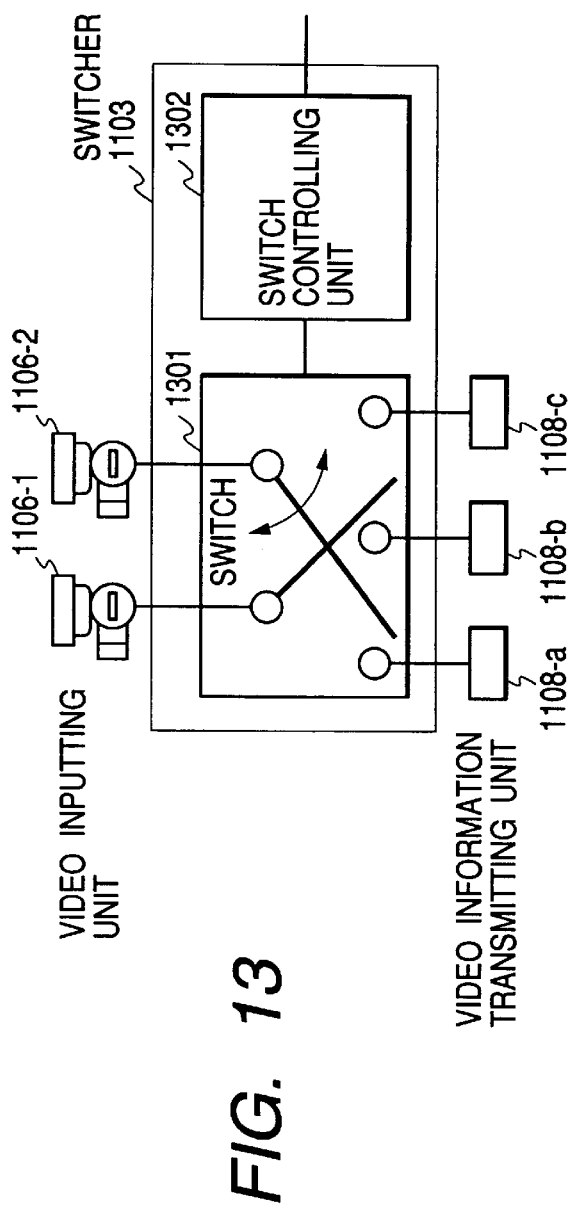
FIG. 13 is a diagram showing a structure of another example of the switcher having a plurality of outputs according to the sixth embodiment.

FIG. 13 shows another example where the above switcher 1103 of this embodiment has a plurality of inputs. In FIG. 13, reference numeral 1301 denotes switches for selecting a plurality of terminals connected to the video information transmitting units 1108 and connecting the same, and 1302 a switch controlling unit for receiving a control request form the outside to operate the switches 1301.

Next, description will be made of an operation of the video transmitting apparatus with the structure shown in FIGS. 11 through 13.

When the user makes a request to display video obtained by the camera 1106 on the monitor 1104-*c* through the video display requesting unit 1105, the video display requesting unit 1105 instructs the switcher 1103 to connect by means of the switch 1201, the video information obtained by the camera 1106 is fed to the video information transmitting unit 1108-*c* which can transmit the video information over the transmission media 1101-*c* through which the monitor 1104-*c* receives the video information to be displayed. The video display requesting unit 1105 is connected to the switcher 1103 via the control information transmitting-receiving unit 1107-*c*, the transmission medium 1101-*c*, the video information transmitting unit 1108-*c* and the control information outputting line 1109 so that the video display requesting unit 1105 requests the control information transmitting-receiving unit 1107-*c* to transmit a switch instruction. The control information transmitting-receiving unit 1107-*c* transmits the switch instruction to the switcher 1103 via the transmission medium 1101-*c*, the video information transmitting unit 1108-*c*, and the control information outputting line 1109. In the switcher 1103 having received the instruction, the switch controlling unit 1202 operates the switch 1201 to output the video information to the video information transmitting unit 1108-*c*.

Following that, the video display requesting unit 1105 instructs the video information transmitting unit 1108-*c* to transmit the video information using a band of, for example, the channel 7. According to this embodiment, the video display requesting unit 1105 is connected to the video information transmitting unit 1108-*c* via the control information transmitting-receiving unit 1107-*c* and the transmission medium 1101-*c* so that the video display requesting unit 1105 requests the control information transmitting-receiving unit 1107-*c* to transmit a transmit instruction. The control information transmitting-receiving unit 1107-*c* transmits the transmit instruction to the video information transmitting unit 1108-*c* over the transmission medium 1101-*c*. Whereby, the video obtained by the camera 1106 is displayed on the monitor 1104-*c*.

If it is desired to monitor plural sorts of video by preparing a plurality of the cameras 1106, a set of the video information transmitting units 1108-*a* through 1108-*c* and the switcher 1103 is prepared for each of the cameras 1106, whereby a plurality of videos are displayed.

If the switcher 1103 has a plurality of outputs as shown in FIG. 13, the video display requesting unit 1105 requests each of the switches 1301 to connect a desired video information transmitting unit 1108-*a*, 1108-*b* or 1108-*c*, whereby plural sorts of video are displayed.

As described in the second embodiment (refer to FIGS. 4 and 5), by providing a clock by, for example, the clock generating unit 407 (synchronization signal generating means), the video information multiplexed and transmitted on the transmission media is synchronized (vertical synchronization, horizontal synchronization, or the like), and synchronization signals are also multiplexed and transmitted. Further, each of the video information transmitting units 1102-*a* through 1102-*c* switches at a timing of the above synchronization signal, whereby video is transmitted without distortion at the time of a switching.

According to this embodiment, there are provided the switcher 1103 for switching/selecting video inputted from the camera (video inputting unit) and the video information transmitting units 1108-*a* through 1108-*c* for multiplexing the video information outputted from the switcher 1103 and transmitting the same over the transmission media 1101-*a* through 1101-*c*, whereby a reception of a request from the video display requesting unit 1105, that is, a control for switching the video, is performed on the camera's side. Even if the number of the monitors (video displaying units) is larger than the number of the cameras (video inputting units), it is possible to realize a remote control similarly to the first embodiment without complicating the structure of the apparatus, which is very practical.

(g) Description of Seventh Embodiment

Next, description will be made of a seventh embodiment of this invention referring to FIGS. 14 and 15.

Figure 14:
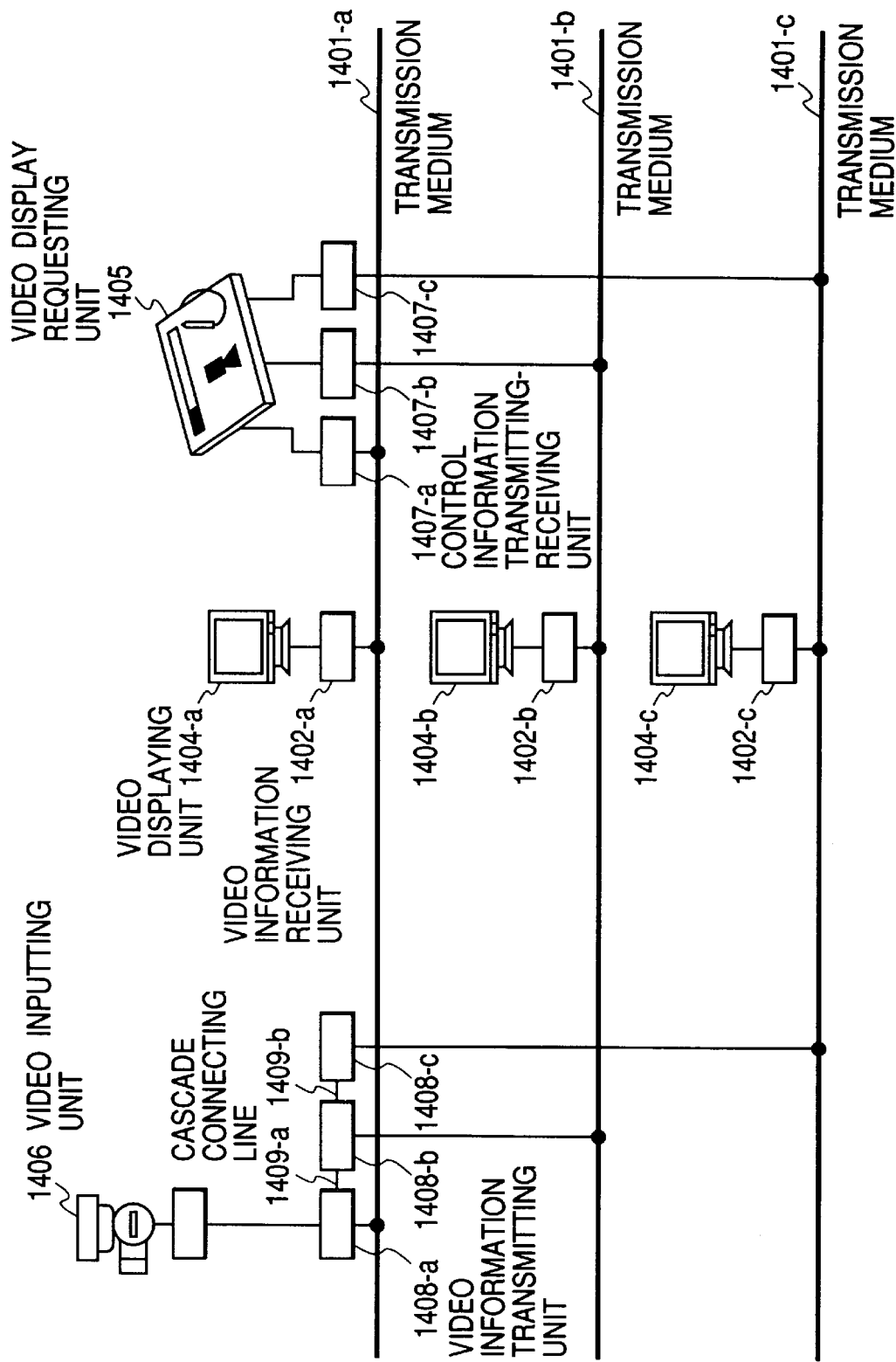
FIG. 14 is a block diagram showing a structure of a video transmitting apparatus according to a seventh embodiment of this invention.

FIG. 14 is a block diagram showing a structure of a video transmitting apparatus according to the seventh embodiment of this invention. In FIG. 14, reference numerals 1401-*a* through 1401-*c* denote a plurality of transmission media on which video information is multiplexed and transmitted, 1402-*a* through 1402-*c* video information receiving units each for receiving video information in a specific transmission band (channel) among video information multiplexed on the corresponding transmission medium 1041-*a*, 1041-*b* or 1041-*c* and outputting contents of the video information, 1404-*a* through 1404-*c* video displaying units for displaying the video information, 1405 a video display requesting unit connected to each of control information transmitting-receiving units 1407-*a* through 1407-*c* to request to display specific video information on the corresponding video displaying unit 1404-*a*, 1404-*b* or 1404-*c* when looked from a user's viewpoint, or request to transmit specific video information to the corresponding transmission medium 1401-*a*, 1401-*b* or 1401-*c* when look from an apparatus's viewpoint, 1406 a video inputting unit for inputting video information, 1407-*a* through 1407-*c* the control information transmitting-receiving units connected to the respective transmission media 1401-*a* through 1401-*c* to transmit/receive control information enabling a remote control through the transmission media 1401-*a* through 1401-*c*, that is, information enabling an operation through the transmission media 1401-*a* through 1401-*c* even without direct connections, and 1408-*a* through 1408-*c* video information transmitting units each for modulating video information using a specific transmission band (channel) to multiplex the video information and transmit the same on the corresponding transmission medium 1401-*a*, 1401-*b* or 1401-*c*.

Similarly to the first embodiment, here are assumed monitors as the video outputting units 1404-*a* through 1404-*c* and a camera as the video inputting unit 1406.

Figure 15:
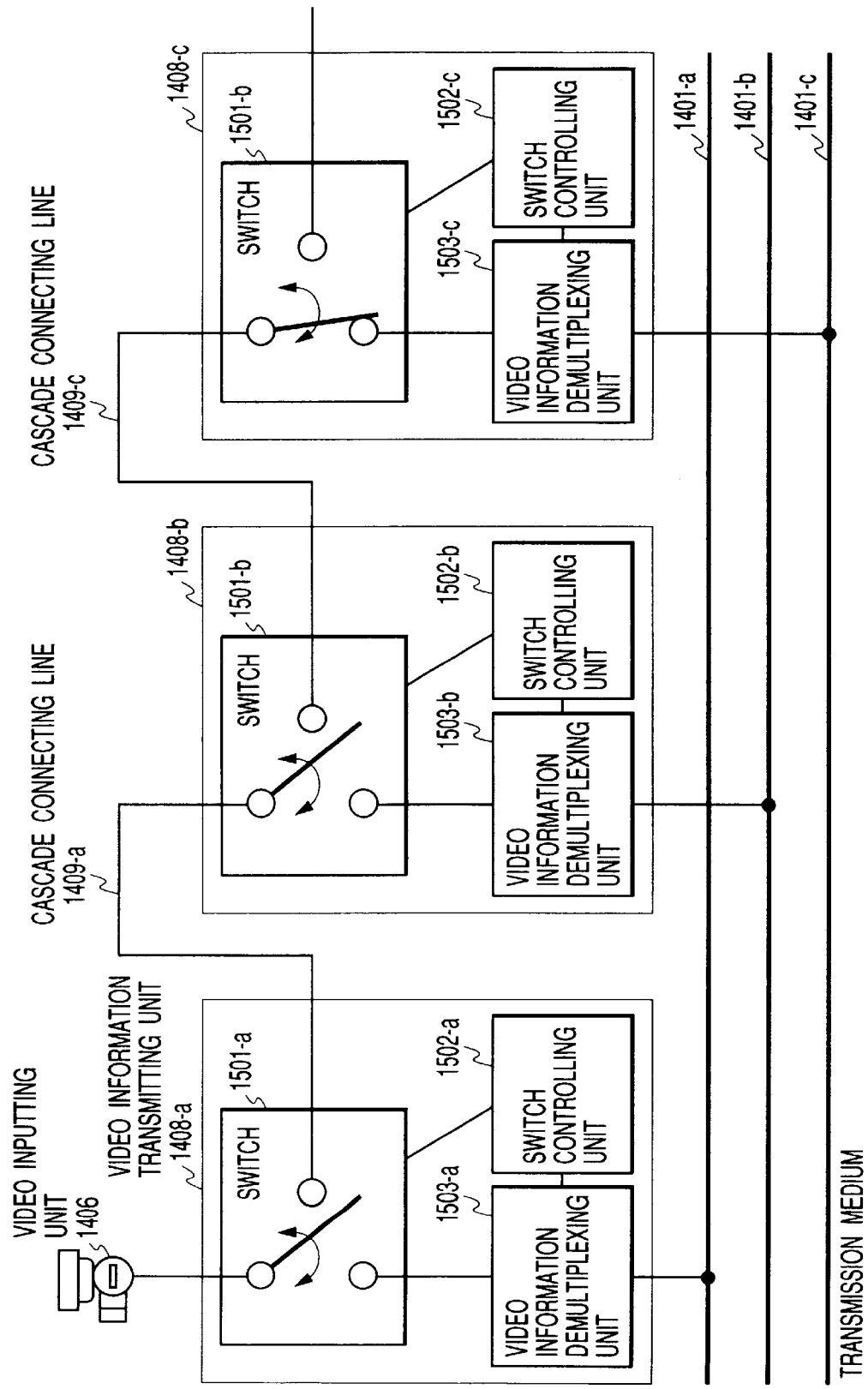
FIG. 15 is a diagram showing structures of video information transmitting units in the video transmitting apparatus according to the seventh embodiment.
Figure 16:
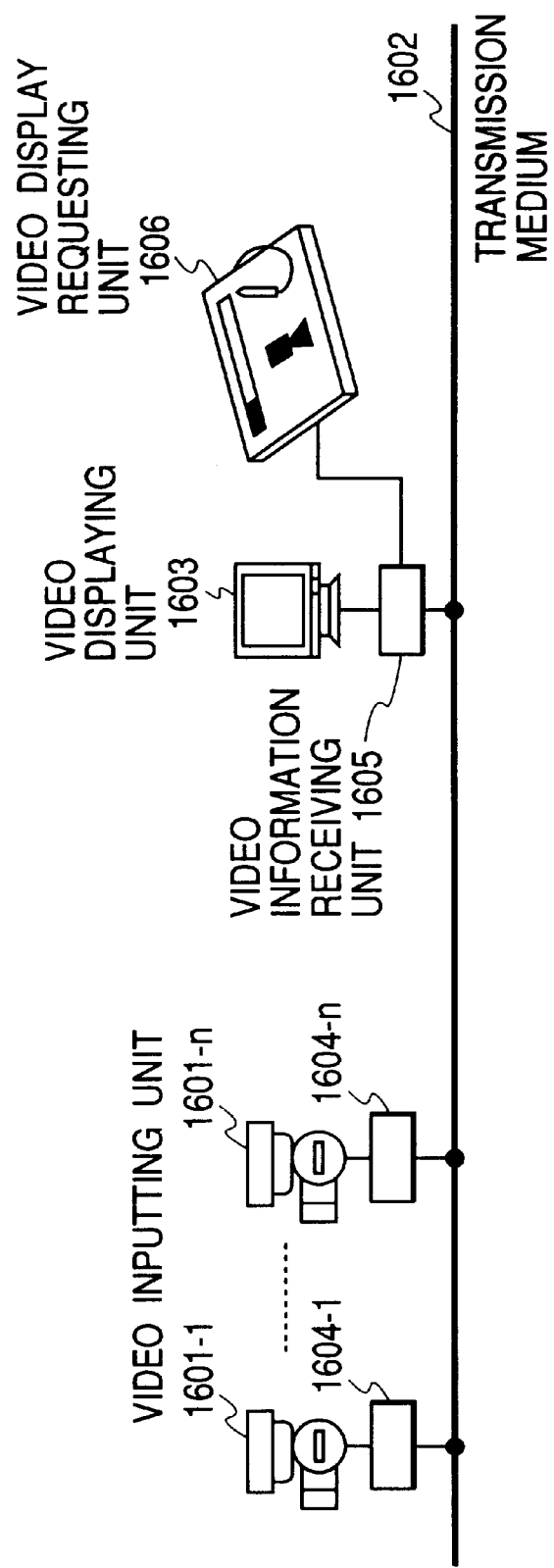
FIG. 16 is a block diagram showing a known video transmitting apparatus.

FIG. 15 shows structures of the video information transmitting units 1408-*a* through 1408-*c* according the seventh embodiment. In FIG. 15, reference numerals 1501-*a* through 1501-*c* denote switches each for selecting whether the video information is transmitted to a corresponding cascade connecting line 1409-*a* or 1409-*b* (that is, a connecting line through which signals from a video player system is transmitted when video of the video system is watched, or signals received by an antenna is transmitted through an inside of the video player system when video of a television receiver is watched, represented by a through line used when the television receiver and the video player system are connected), or transmitted to the corresponding transmission medium 1401-*a*, 1401-*b* or 1401-*c*, 1502-*a* through 1502-*c* switch controlling units each for receiving a control request from the outside to operate the corresponding switch 1501-*a*, 1501-*b* or 1501-*c*, and 1503-*a* through 1503-*c* video signal modulating circuits each for modulating the video information in a transmission band (channel) to be transmitted to the corresponding transmission medium 1401-*a*, 1401-*b* or 1401-*c* and transmitting the same.

Next, description will be made of an operation of the video transmitting apparatus with the structure shown in FIGS. 14 and 15.

When the user requests to display video of the camera 1406 on the monitor 1404-*c* through the video display requesting unit 1405, the video display requesting unit 1405 requests the video information transmitting unit 1408-*c*, which can transmit video information obtained by the camera 1406 to the transmission medium 140 1-*c* to be received by the monitor 1404, to select the transmission medium's side as an output between the cascade connecting line's side and the transmission medium's side. In the video information transmitting unit 1408-*c* having received the instruction, the switch controlling unit 1502-*c* operates the switch 1501-*c* to select the transmission medium's side, and outputs the video information to the transmission medium 1401-*c*. The video display requesting unit 1405 further requests the video information transmitting units 1408-*a* and 1408-*b* to select the cascade connecting line's side as outputs. In the video information transmitting units 1408-*a* and 1408-*b*, the switch controlling units 1502-*a* and 1502-*b* operate the switches 1501-*a* and 1501-*b*, respectively, to output the video information to the cascade connecting lines 1409-*a* and 1409-*b*. According to this embodiment, the video display requesting unit 1405 is connected to the video information transmitting units 1408-*a* through 1408-*c* via the control information transmitting-receiving units 1407-*a* through 1407-*c* and the transmission media 1401-*a* through 1401-*c* so that the video display requesting unit 1405 requests each of the control information transmitting-receiving units 1407-*a* through 1407-*c* to send a switch instruction. Each of the control information transmitting-receiving units 1407-*a* through 1407-*c* transmits the switch instruction to the corresponding video information transmitting unit 1408-*a*, 1408-*b* or 1408*c* through the corresponding transmission medium 1401-*a*, 1401-*b* or 1401-*c*.

Following that, the video display requesting unit 1405 instructs the video information transmitting unit 1408-*c* to transmit the video information using a band of, for example, the channel 7. According to this embodiment, the video display requesting unit 1405 is connected to the video information transmitting unit 1408-*c* via the control information transmitting-receiving unit 1407-*c* and the transmission medium 1401-*c* so that the video display requesting unit 1405 requests the control information transmitting-receiving unit 1407-*c* to send a transmit instruction to the video information transmitting unit 1408-*c*. The control information transmitting-receiving unit 1407-*c* transmits the transmit instruction to the video information receiving unit 1408-*c* via the transmission medium 1401-*c*. Whereby, the video of the camera 1406 is displayed on the monitor 1404-*c*.

If it is desired to monitor plural sorts of video by preparing a plurality of the cameras 1406, a set of the video information transmitting units 1408-*a* through 1408-*c* is prepared for each of the monitors 1406, whereby plural sorts of video are displayed.

As described in the second embodiment (refer to FIGS. 4 and 5), by providing a clock by, for example, the clock generating unit 407 (synchronization signal generating means), the video information multiplexed and transmitted on the transmission media is synchronized (vertical synchronization, horizontal synchronization, or the like), and synchronization signals are also multiplexed and transmitted. Further, each of the video information transmitting units 1408-*a* through 1408-*c* switches at a timing of the above synchronization signal, whereby video is transmitted without distortion at the time of a switching.

According to this embodiment, the video information transmitting units 1408-*a* through 1408-*c* are connected to one another by the cascade connecting lines 1409-*a* and 1409-*c*, and each of the video information transmitting units 1408-*a* through 1408-*c* has a function of selecting whether the video information inputted from the camera (video inputting unit) is transmitted to the transmission medium 1401-*a*, 1401-*b* or 1401-*c* or the cascade connecting line 1409-*a* or 1409-*c* so that a reception of a request from the video display requesting unit 1405, that is, a control for switching the video, is performed on the camera's side. Whereby, a remote control is possible similarly to the first embodiment without complicating the whole structure (that is, without necessity of providing the video information receiving units nm in proportion in number to the monitors n and the transmission media m) even if the number of the monitors (video displaying units) is larger than the number of the cameras (video inputting units). Accordingly, this embodiment is very practical.

What is claimed is:

1. A video transmitting apparatus comprising:
   a plurality of transmission media over each of which multiplexed video information is transmitted;
   a plurality of video information receiving units, one or more of which is connected to each of said transmission media to receive, through demultiplexing, specific video information among said multiplexed video information transmitted on a corresponding transmission medium;
   a switcher connected to said plural video information receiving units to select one or more pieces of video information among plural pieces of video information outputted from said video information receiving units;
   a video displaying unit connected to said switcher to display said video information selected by said switcher; and
   a video display requesting unit connected to said switcher and each of said plural video information receiving units to request to display specific video information on said video displaying unit by sending a signal to one of said plural video information receiving units to select said specific video information through demultiplexing and by sending another signal to said switcher to select one of outputs of said plural video information receiving units.

2. The video transmitting apparatus according to claim 1 further comprising:
   a synchronization signal generating unit for supplying a synchronization signal to said transmission media in order to synchronize said video information multiplexed and transmitted on said transmission media; and
   a synchronization signal detecting unit for detecting said synchronization signal on said transmission media;
   wherein said switcher switched said video information at a timing of said synchronization signal detected by said synchronization signal detecting unit.

3. A video transmitting apparatus comprising:
   a plurality of transmission media over each of which multiplexed video information is transmitted;
   a plurality of video information receiving units, one or more of which is connected to each of said transmission media to receive, through demultiplexing, specific video information among said multiplexed video information transmitted on a corresponding transmission medium;
   a switcher connected to said plural video information receiving units to select one or more pieces of video information among plural pieces of video information outputted from said video information receiving units;
   a video displaying unit connected to said switcher to display said video information selected by said switcher;
   a plurality of control information transmitting-receiving units, one or more of which is connected to each of said transmission media to transmit and receive control information enabling a control through said corresponding transmission medium; and
   a video display requesting unit connected to said switcher to request to display specific video information on said video displaying unit by sending a signal to said switcher to select one of outputs of said plural video information receiving units;
   wherein when a user of said video transmitting apparatus requests to display specific video information on said video displaying unit through said video display requesting unit, said video display requesting unit requests a relevant video information receiving unit that can receive said specific video information through a corresponding control information transmitting-receiving unit and said corresponding transmission medium connected to said corresponding control information transmitting-receiving unit and said relevant video information receiving unit to receive said specific video information, and said video display requesting unit also requests said switcher to select said specific video information.

4. The video transmitting apparatus according to claim 3 further comprising:

a synchronization signal generating unit for supplying a synchronization signal to said transmission media in order to synchronize said video information multiplexed and transmitted said transmission media; and a synchronization signal detecting unit for detecting said synchronization signal on said transmission media;

wherein said switcher switches said video information at a timing of said synchronization signal detected by said synchronization signal detecting unit.

5. A video transmitting apparatus comprising:

a plurality of transmission media over each of which multiplexed video information is transmitted;

a plurality of video information receiving units, one or more of which is connected to each of said transmission media to receive, through demultiplexing, specific video information among said multiplexed video information transmitted on a corresponding transmission medium;

a switcher connected to said plural video information receiving units to select one or more pieces of video information among plural pieces of video information outputted from said video information receiving units, said switcher being connected to each of said video information receiving units through control information outputting lines to receive control information;

a video displaying unit connected to said switcher to display said video information selected by said switcher;

a plurality of control information transmitting-receiving units, one or more of which is connected to each of said transmission media to transmit and receive control information enabling a control through said corresponding transmission medium; and a video display requesting unit connected to each of said plural control information transmitting-receiving units to request to display specific video information on said video displaying unit;

wherein when a user of said video transmitting apparatus requests to display specific video information on said video displaying unit through said video display requesting unit, said video display requesting unit requests a relevant video information receiving unit that can receive said specific video information through a corresponding control information transmitting-receiving unit and said corresponding transmission medium connected to said corresponding control information transmitting-receiving unit and said relevant video information receiving unit to receive said specific video information, and said video display requesting unit also requests said switcher through said corresponding control information transmitting-receiving unit, said corresponding transmission medium, said relevant video information receiving unit and at least one control information outputting line connecting said relevant video information receiving unit to said switcher to select said specific video information.

6. The video transmitting apparatus according to claim 5 further comprising:

a synchronization signal generating unit for supplying a synchronization signal to said transmission media in order to synchronize said video information multiplexed and transmitted on said transmission media; and a synchronization signal detecting unit for detecting said synchronization signal on said transmission media;

wherein said switcher switches said video information at a timing of said synchronization signal detected by said synchronization signal detecting unit.

7. A video transmitting apparatus comprising:

a plurality of transmission media over each of which multiplexed video information is transmitted;

a plurality of video information receiving units, one or more of which is connected to each of said transmission media to receive, through demultiplexing, specific video information among said multiplexed video information on a corresponding transmission medium, said plural video information receiving units being connected by through lines to one another to transmit video information from one to another;

a video displaying unit connected to any of said plural video information receiving units to display said video information outputted from said connected video information receiving unit; and a video display requesting unit connected to each of said plural video information receiving units to request to display specific video information on said video displaying unit;

wherein when any one of said video information receiving units other than said video information receiving unit connected to said video displaying unit receives video information through a corresponding transmission medium, said video information receiving unit supplies said received video information to said video displaying unit through one or more of said through lines and one or more of said video information receiving units;

and said video displaying requesting unit instructs each of said video information receiving units to select whether said video information is received through said corresponding transmission medium or through said through line.

8. The video transmitting apparatus according to claim 7 further comprising:

a synchronization signal generating unit for supplying a synchronization signal to said transmission media in order to synchronize said video information multiplexed and transmitted on said transmission media; and a synchronization signal detecting unit for detecting said synchronization signal on said transmission media;

wherein said video information receiving units switch said video information at a timing of said synchronization signal detected by said synchronization signal detecting unit.

9. A video transmitting apparatus comprising:

a plurality of transmission media over each of which multiplexed video information is transmitted;

a plurality of video information receiving units, one or more of which is connected to each of said transmission media to receive, through demultiplexing, specific video information among said multiplexed video information on a corresponding transmission medium, said video information receiving units being connected by through lines to one another so as to transmit video information from one to another;

a video displaying unit connected to any one of said video information receiving units to display video information outputted from said connected video information receiving unit; and a plurality of control information transmitting-receiving units, one or more of which is connected to each of said transmission media to transmit and receive control information enabling a control through said corresponding transmission medium; and a video display requesting unit connected to each of said plural control information transmitting-receiving units to request to display specific video information on said video displaying unit;

wherein when a user of said video transmitting apparatus requests to display specific video information on said video displaying unit through said video display requesting unit, said video display requesting unit requests a relevant video information receiving unit which can receive said specific video information through a corresponding control information transmitting-receiving unit and said corresponding transmission medium connected to said corresponding control information transmitting-receiving unit and said relevant video information receiving unit to receive said specific video information;

said relevant video information receiving unit outputs said specific video information to said video displaying unit if being directly connected to said video displaying unit, or outputs said specific video information to said video displaying unit through one or more of said through lines and one or more of said video information receiving units if not being directly connected to said video displaying unit.

10. The video transmitting apparatus according to claim 9 further comprising:

a synchronization signal generating unit for supplying a synchronization signal to said transmission media in order to synchronize said video information multiplexed and transmitted on said transmission media; and a synchronization signal detecting unit for detecting said synchronization signal on said transmission media;

wherein said video information receiving units switch said video information at a timing of said synchronization signal detected by said synchronization signal detecting unit.

11. A video transmitting apparatus comprising:

a plurality of transmission media over each of which multiplexed video information is transmitted;

a video inputting unit for obtaining said video information by photographing video or regenerating accumulated video;

a switcher connected to said video inputting unit to output video information from said video inputting unit to a selected route;

a plurality of video information transmitting units each for connecting said switcher to a corresponding transmission medium to multiplex video information outputted from said switcher on said corresponding transmission medium to transmit multiplexed video information, each of said video information transmitting units also being connected to said switcher through a control information outputting line to supply control information to said switcher;

a plurality of control information transmitting-receiving units, one or more of which is connected to each of said transmission media to transmit and receive control information enabling a control through said corresponding transmission medium; and a video display requesting unit connected to each of said plural control information transmitting-receiving units to request to transmit specific video information through a corresponding transmission medium;

wherein when a user of said video transmitting apparatus requests to display specific video information through said video display requesting unit, said video display requesting unit requests a relevant video information transmitting unit through a corresponding control information transmitting-receiving unit and said corresponding transmission medium connected to said corresponding control information transmitting-receiving unit and said relevant video information transmitting unit to transmit said specific video information, and said video display requesting unit also requests said switcher through said corresponding control information transmitting-receiving unit, said corresponding transmission medium, said relevant video information transmitting unit and at least one control information outputting line connecting said relevant video information transmitting unit to said switcher to select said relevant video information transmitting unit so as to transmit said specific video information from said relevant video information transmitting unit.

12. The video transmitting apparatus according to claim 11 further comprising:

a synchronization signal generating unit for supplying a synchronization signal to said transmission media in order to synchronize said video information multiplexed and transmitted on said transmission media; and a synchronization signal detecting unit for detecting said synchronization signal on said transmission media;

wherein said switcher switches said video information at a timing of said synchronization signal detected by said synchronization signal detecting unit.

13. A video transmitting apparatus comprising:

a plurality of transmission media over each of which multiplexed video information is transmitted;

a video inputting unit for obtaining video information by photographing video or regenerating accumulated video;

a plurality of video information transmitting units, one or more of which is connected to a corresponding transmission medium to multiplex said video information inputted from said video inputting unit on said corresponding transmission medium and transmit multiplexed video information, said video information transmitting units being connected by through lines to one another to transmit video information from one to another, and any one of said video information transmitting unit being directly connected to said video inputting unit;

a plurality of control information transmitting-receiving units, one or more of which is connected to a corresponding transmission media to transmit and receive control information enabling a control through said corresponding transmission medium; and a video display requesting unit connected to each of said plural control information transmitting-receiving units to request to transmit specific video information through a corresponding transmission medium;

wherein when a user of said video transmitting apparatus requests to transmit specific video information through said video display requesting unit, said video display requesting unit requests a relevant video information transmitting unit through a corresponding control information transmitting-receiving unit and said corresponding transmission medium connected to said corresponding control information transmitting-receiving unit and said relevant video information transmitting unit to transmit said specific video information, and said relevant video transmitting unit receives said specific video information from said video inputting unit if being directly connected to said video inputting unit and outputs said specific information to said corresponding transmission medium, or receives said specific video information from said video inputting unit through one or more of said video information transmitting units and one or more of said through lines if not being directly connected to said video inputting unit and outputs said specific video information to said corresponding transmission medium.

14. The video transmitting apparatus according to claim 13 further comprising:

a synchronization signal generating unit for supplying a synchronization signal to said transmission media in order to synchronize said video information multiplexed and transmitted on said transmission media; and a synchronization signal detecting unit for detecting said synchronization signal on said transmission media;

wherein said video information transmitting units switch said video information at a timing of said synchronization signal detected by said synchronization signal detecting unit.

* * * * *